US008176467B2

(12) United States Patent
Weng et al.

(10) Patent No.: US 8,176,467 B2
(45) Date of Patent: May 8, 2012

(54) COMPUTER PROGRAM GENERATION SYSTEM AND METHOD THEREOF

(75) Inventors: Kenneth Weng, Scottsdale, AZ (US); Jun Ping Zhang, Scottsdale, AZ (US); Darrell Gene Hansen, Layton, UT (US)

(73) Assignee: Harris Corporation, Melbourne, FL (US)

( * ) Notice: Subject to any disclaimer, the term of this patent is extended or adjusted under 35 U.S.C. 154(b) by 1415 days.

(21) Appl. No.: 11/493,300

(22) Filed: Jul. 25, 2006

(65) Prior Publication Data

US 2008/0028366 A1  Jan. 31, 2008

(51) Int. Cl.
G06F 9/44 (2006.01)

(52) U.S. Cl. ........................................ 717/106

(58) Field of Classification Search ........... 717/106–109
See application file for complete search history.

(56) References Cited

U.S. PATENT DOCUMENTS

| | | | |
|---|---|---|---|
| 4,764,763 A | 8/1988 | Wickstead et al. | |
| 4,841,291 A | 6/1989 | Swix et al. | |
| 5,187,788 A * | 2/1993 | Marmelstein | 717/109 |
| 5,261,820 A | 11/1993 | Slye et al. | |
| 5,701,139 A | 12/1997 | Weinbaum et al. | |
| 5,832,270 A * | 11/1998 | Laffra et al. | 717/125 |
| 6,046,741 A | 4/2000 | Hochmuth | |
| 6,126,330 A * | 10/2000 | Knight | 717/127 |
| 6,243,707 B1 | 6/2001 | Humpleman et al. | |
| 6,268,852 B1 * | 7/2001 | Lindhorst et al. | 715/744 |
| 6,452,606 B1 | 9/2002 | Luzzatto | |
| 6,466,240 B1 | 10/2002 | Maslov | |
| 6,518,978 B1 | 2/2003 | Omaha et al. | |
| 6,532,023 B1 | 3/2003 | Schumacher et al. | |
| 6,674,447 B1 | 1/2004 | Chiang et al. | |
| 6,690,392 B1 | 2/2004 | Wugoski | |
| 6,742,175 B1 * | 5/2004 | Brassard | 717/107 |
| 6,842,755 B2 | 1/2005 | Maslov | |
| 6,864,901 B2 | 3/2005 | Chang et al. | |
| 6,933,556 B2 | 8/2005 | Endoh et al. | |
| 6,941,313 B2 | 9/2005 | Seliger et al. | |
| 6,971,067 B1 | 11/2005 | Karson et al. | |
| 7,111,016 B2 * | 9/2006 | Gurevich | 717/108 |
| 7,137,100 B2 * | 11/2006 | Iborra et al. | 717/106 |
| 7,231,631 B1 * | 6/2007 | Branch et al. | 717/108 |
| 7,340,715 B2 * | 3/2008 | Liu | 717/105 |
| 7,559,032 B2 * | 7/2009 | King et al. | 715/763 |
| 7,636,894 B2 * | 12/2009 | Vedula et al. | 715/763 |
| 7,653,896 B2 * | 1/2010 | Herdeg, III | 717/113 |
| 2002/0023261 A1 * | 2/2002 | Goodwin et al. | 717/146 |
| 2002/0087946 A1 * | 7/2002 | Sakamoto et al. | 717/109 |
| 2003/0023952 A1 * | 1/2003 | Harmon, Jr. | 717/106 |

(Continued)

OTHER PUBLICATIONS

HL7 Australia CCOW Resources Page; http://www.hl7.org.au/CCOW.htm; retrieved from the internet on Jun. 28, 2006; 2 pages.

(Continued)

Primary Examiner — Anna Deng
(74) Attorney, Agent, or Firm — Bryan Cave LLP

(57) ABSTRACT

An computer program generation system (100) for creating a computer program includes: (a) a recorder module (103) capable of recording data comprising actions of a user of one or more applications; (b) a storage module (112) to store predefined portions of source code; and (c) a code generation module (105) capable of generating source code for the computer program using the data and the predefined portions of source code from the storage module (112).

41 Claims, 21 Drawing Sheets

U.S. PATENT DOCUMENTS

| | | | |
|---|---|---|---|
| 2003/0115572 A1* | 6/2003 | Zondervan et al. | 717/109 |
| 2004/0015832 A1* | 1/2004 | Stapp et al. | 717/106 |
| 2004/0221260 A1* | 11/2004 | Martin et al. | 717/104 |
| 2004/0255270 A1* | 12/2004 | McGlinchey et al. | 717/109 |
| 2005/0137908 A1* | 6/2005 | Fusari et al. | 705/2 |
| 2005/0160371 A1 | 7/2005 | Karson et al. | |
| 2005/0165790 A1 | 7/2005 | Seliger et al. | |
| 2006/0075020 A1 | 4/2006 | Seliger et al. | |
| 2006/0101393 A1* | 5/2006 | Gerken et al. | 717/109 |
| 2006/0150148 A1* | 7/2006 | Beckett et al. | 717/109 |
| 2006/0168115 A1* | 7/2006 | Loupia et al. | 709/218 |
| 2007/0168931 A1* | 7/2007 | Martin et al. | 717/104 |
| 2007/0240118 A1* | 10/2007 | Keren | 717/124 |
| 2009/0157807 A1* | 6/2009 | Brown et al. | 709/203 |

OTHER PUBLICATIONS

Fusion from Carefx™; The First Patient Information Aggregation platform for the healthcare industry; 10 pages.

HL7 Context Management "CCOW" Standard: Component Technology Mapping: Web/HTTP, Draft Version 1.5, Jan. 19, 2003; 72 pages.

HL7 Context Management "CCOW" Standard: Component Technology Mapping: ActiveX, Draft Version 1.5, Apr. 30, 2003; 49 pages.

HL7 Context Management "CCOW" Draft Standard: Subject Data Definitions, Version 1.5, Apr. 30, 2003; 58 pages.

HL7 Context Management "CCOW" Standard: Technology- and Subject-Independent Component Architecure, Draft Version 1.5, Apr. 30, 2003; 225 pages.

Web Services Coordination (WS-Coordination); Version 1.0; Aug. 2005; 23 pages.

HL7 Context Management "CCOW" Standard: Component Technology Mapping: ActiveX,; Version 1.5; May 2004; 50 pages.

HL7Context Management "CCOW" Standard: Technology- and Subject-Independent Component Architecture; Version 1.5; May 2004; 223 pages.

HL7 Context Management "CCOW" Standard: Subject Data Definitions; Version 1.5; May 2004; 47 pages.

HL7 Context Management "CCOW" Standard: Component Technology Mapping: Web/HTTP; Version 1.5; May 2004; 74 pages.

HL7 Context Management "CCOW" Standard: User Interface: Microsoft Windows and Web; Version 1.5; May 2004; 16 pages.

PCT International Publication No. WO 01/11464 for International Application No. PCT/US00/14942.

PCT International Publication No. WO 00/59286 for International Application No. PCT/US00/09348.

U.S. Appl. No. 09/583,301, filed May 30, 2000, Seliger, et al.

* cited by examiner

1335

COMPUTER PROGRAM GENERATION SYSTEM AND METHOD THEREOF

FIELD OF THE INVENTION

This invention relates generally to a system for generating a computer program, and relates more particularly to a computer program generation system for creating a computer program by recording the actions of a user.

BACKGROUND OF THE INVENTION

In many commercial endeavors, a plurality of computer applications share a set of data. For example, in the field of medicine, a user can input the same information describing a particular patient to multiple computer applications. The information can be patient information (such as name, sex, social security number, primary physician, medical history, drug interactions, etc.), user information (such as user identification, password, etc.), encounter or visit information (such as date, encounter number, name of treating physician, etc.), observation information (such as diagnosis, blood test results, etc.), financial information (such as insurance coverage, billing history, etc.), or other types of information. The user's task historically entailed repeatedly entering the same data describing the patient into multiple computer applications. This practice of repeatedly entering the same data for multiple computer applications not only applies to the medical field, but also extends to other fields.

The healthcare industry recognizes the need for managing and sharing data, and in 1999, the Health Level Seven (HL7) published the first Clinical Context Object Workgroup (CCOW) standard (hereafter "the CCOW standard") for context management. The CCOW standard defines a context management architecture (CMA) and processes for managing information describing a subject across a range of clinical and other healthcare-related computer applications. The nature of the CCOW standard is described, for example, in HL7 Context Management Standard, Version 1.5, which was rectified in May 2004.

While the CCOW standard allows context and data sharing, a user still must repeatedly enter the same information into multiple computer applications. For example, following a patient visit, a nurse may have to use the same login information and enter the same patient identification information into three or four different computer applications. Repeatedly entering the same information into multiple applications can be burdensome and time consuming.

Accordingly, a need exists for a method and a system that allows users to easily repeat tasks to streamline workflow and that also allows users to reduce the time wasted on redundant tasks.

BRIEF DESCRIPTION OF THE DRAWINGS

The invention will be better understood from a reading of the following detailed description, taken in conjunction with the accompanying figures in the drawings in which.

Figure 1:
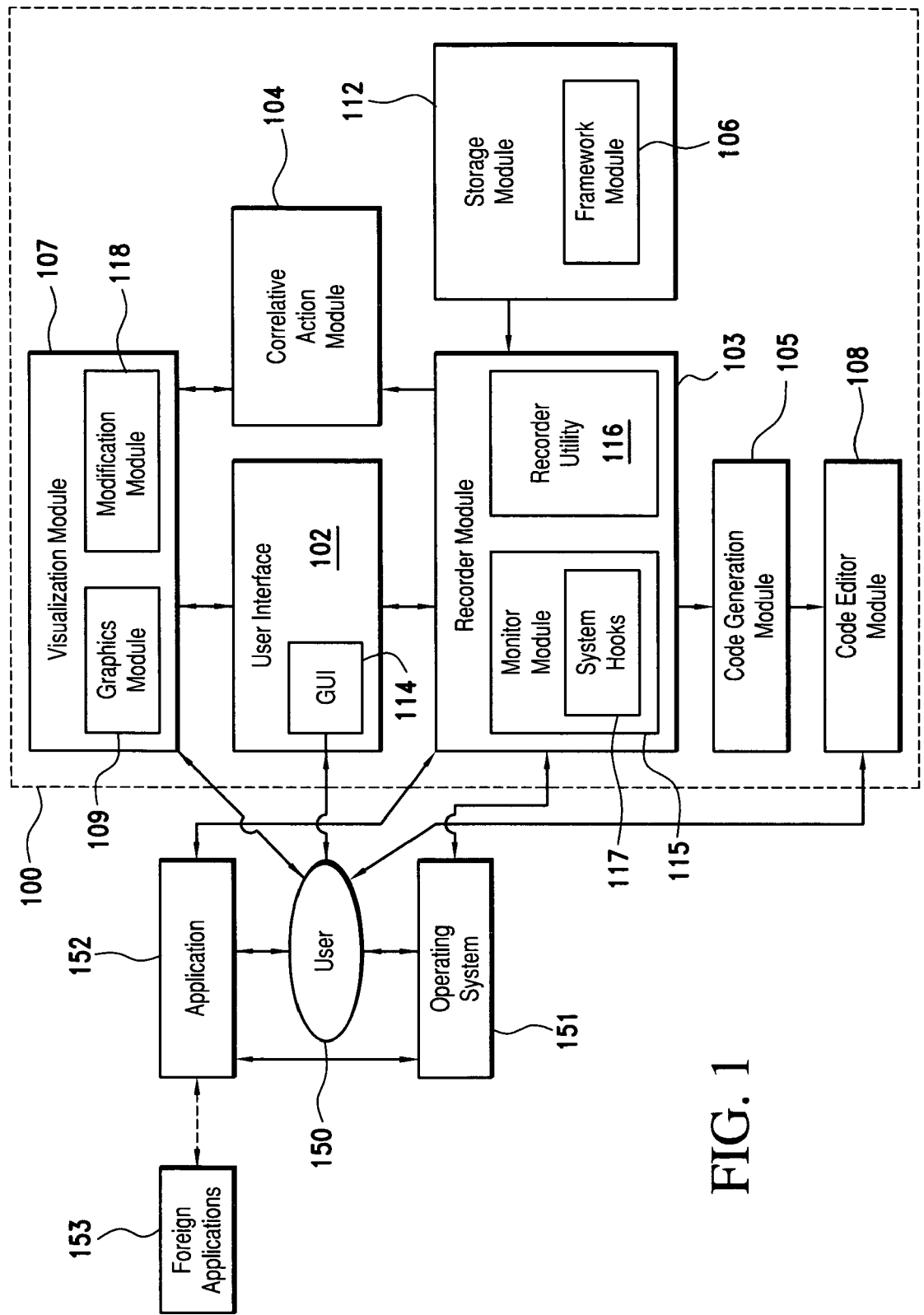
FIG. 1 illustrates a block diagram for a computer program generation system, according to a first embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly coupled in an electrical or non-electrical manner.

DETAILED DESCRIPTION OF THE DRAWINGS

In an embodiment, an computer program generation system for creating a computer program includes: (a) a recorder module capable of recording data comprising actions of a user of one or more applications; (b) a storage module to store predefined portions of source code; and (c) a code generation module capable of generating source code for the computer program using the data and the predefined portions of source code from the storage module.

In a further embodiment, a method for generating a computer program includes: (a) recording actions of a user of one or more running applications; (b) providing predefined portions of source code related to the actions of the user; and (c) generating source code from the actions of the user and the predefined portions of source code. As explained hereinafter, the system and the method can streamline the workflow and minimize redundant data entries and repetitive user actions.

Referring now to the figures, FIG. 1 illustrates a block diagram for a computer program generation system 100, according to a first embodiment. It should be understood that system 100 is merely exemplary and that the present invention may be employed in many embodiments not specifically depicted or otherwise described herein. System 100 can also be referred to as an application.

As an example, system 100 can include: (1) a user interface module 102 capable of rendering a graphical user interface (GUI) 114 on a video screen of a computer; and (2) a recorder module 103 capable of recording data including (a) actions being performed by a user 150 using a first set of data, (b) information about an operating system 151 that is related to the actions of user 150, and (c) information about an application 152 that is related to the actions of user 150. As an example, recorder module 103 can include a monitor module 115 and a recorder utility 116, and monitor module 115 can include system hooks 117, which are explained in more detail hereinafter.

System 100 further includes: (1) a correlative action module 104 capable of creating data objects based on the recorded data; (2) a code generation module 105 capable of generating source code for a computer program by using the recorded data or the data objects; (3) a storage module 112 capable of providing predefined portions of source code for the computer program; (4) a visualization module 107 capable of generating a visual representation of the actions of user 150; and (5) a code editor module 108 capable of allowing modification to the source code for the computer program. Storage module 112 can include a framework module 106 capable of providing predefined source code needed to facilitate communication between the generated computer program and foreign applications 153, some or all of which may interact with application 152. As an example, visualization module 107 can include a graphics module 109 and a modification module 118, which are explained in more detail hereinafter.

System 100 generates source code or an executable script, which can be compiled into a computer program to permit repetition of the scenario described by the recorded user actions. In some embodiments, execution of the computer program repeats the actions of user 150 using a set of data different from the set of data used during the recording of the scenario or original user actions.

"Application 152," as used herein, can refer to, or otherwise include, a single computer application or to two or more computer applications. "Foreign applications 153," as used herein, can refer to, or otherwise include, one or more computer applications, other than application 152 or operating system 151. Foreign applications 153 can communicate with application 152 directly or indirectly through other applications, a network, and/or the generated computer program. "System," as used herein, can refer to, or otherwise include, one computer application or two or more computer applications.

Operating system 151 is a software program that manages the hardware and software resources of a computer. Operating system 151 performs basic tasks such as, for example, controlling and allocating memory, prioritizing the processing of instructions, controlling input and output devices, facilitating networking and managing files. Examples of common operating systems include Microsoft Windows, Mac OS, UNIX, and Linux.

As used herein, "scenario" refers to or otherwise includes one or more specific functions or tasks for which application 152 can be used. For example, one generated computer program can be used for a scenario where user 150 views or edits information, such as the medical history for a patient, stored in a database or on a network. A second scenario using the same or a different generated computer program can change the context of foreign applications 153 (e.g., change the patient or user). Another example of a scenario is logging into a network or database or changing the user logged into the network or database. A further example of a scenario is entering the billing information for visits by a patient to a doctor or hospital.

Scenarios can be divided generally into two types—lead and follow. Lead scenarios are scenarios where the user performs an action, and application 152, operating system 151, and any of foreign applications 153 follow or make changes based on the actions of the user. Follow scenarios are scenarios where the actions of the user are a reaction to the actions of application 152, operating system 151, or one or more of foreign applications 153.

"Set of data," as used herein, refers to or otherwise includes any group or collection of information, which can be used in relation to application 152. For example, in the healthcare context, the first set of data can be patient information (such as name, sex, primary physician, medical history, drug interactions, etc.), user information (such as user identification, password, etc.), encounter or visit information (such as date, encounter number, name of treating physician, etc.), observation information (such as diagnosis, blood test results, etc.), financial information (such as insurance coverage, billing history, etc.), or other types of information about a first patient, and a second set of data can contain the same information about a second patient.

In some embodiments, one element in the set of data is called a context variable. "Context," as used herein, refers to or otherwise includes identifying variable or variables being changed, manipulated, defined, or set during the scenario. For example, when viewing the patient information, the context can be the patient number in the database or on the network. In the scenario of logging into the network, the context can be the username of the user. In a billings scenario, the context can be the patient number and the visitation date.

Figure 2:
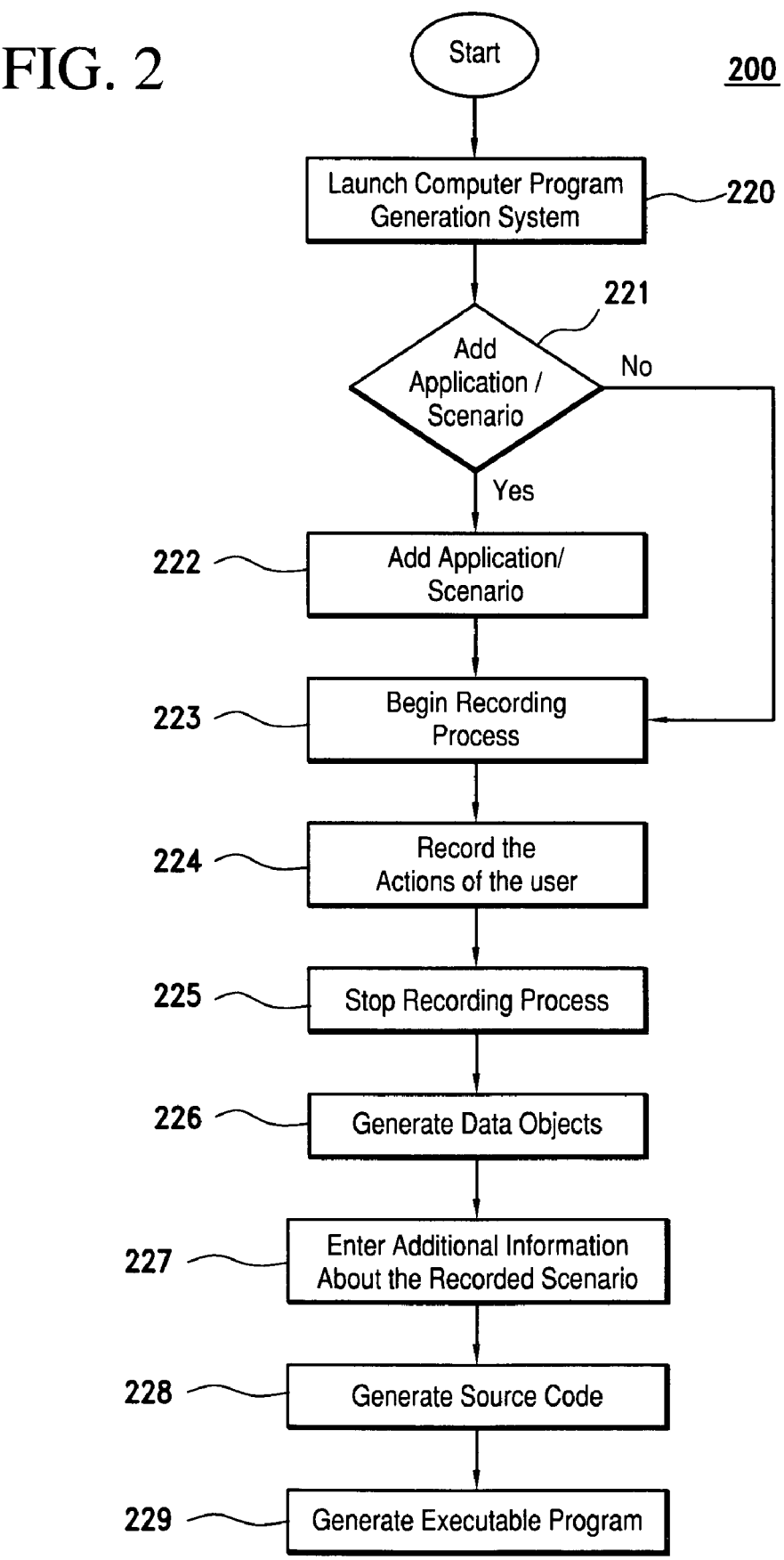
FIG. 2 illustrates a flow chart for a method for generating a computer program using the system of FIG. 1, according to the first embodiment.

FIG. 2 illustrates a flow chart for a method 200 for generating a computer program using system 100, according to the first embodiment. It should be appreciated that this method is merely illustrative of techniques for implementing the various aspects of one embodiment described herein and that system 100 (FIG. 1) and method 200 are not limited to this particular embodiment, as numerous other embodiments are possible.

Method 200 comprises several processes for generating the computer program. A first process 220 for generating the computer program is launching system 100. System 100 can be launched by clicking on an icon on the desktop of operating system 151 or in a menu of operating system 151 on a video screen of a computer. Methods of starting applications on a computer are well known and will not be further described herein.

Figure 3:
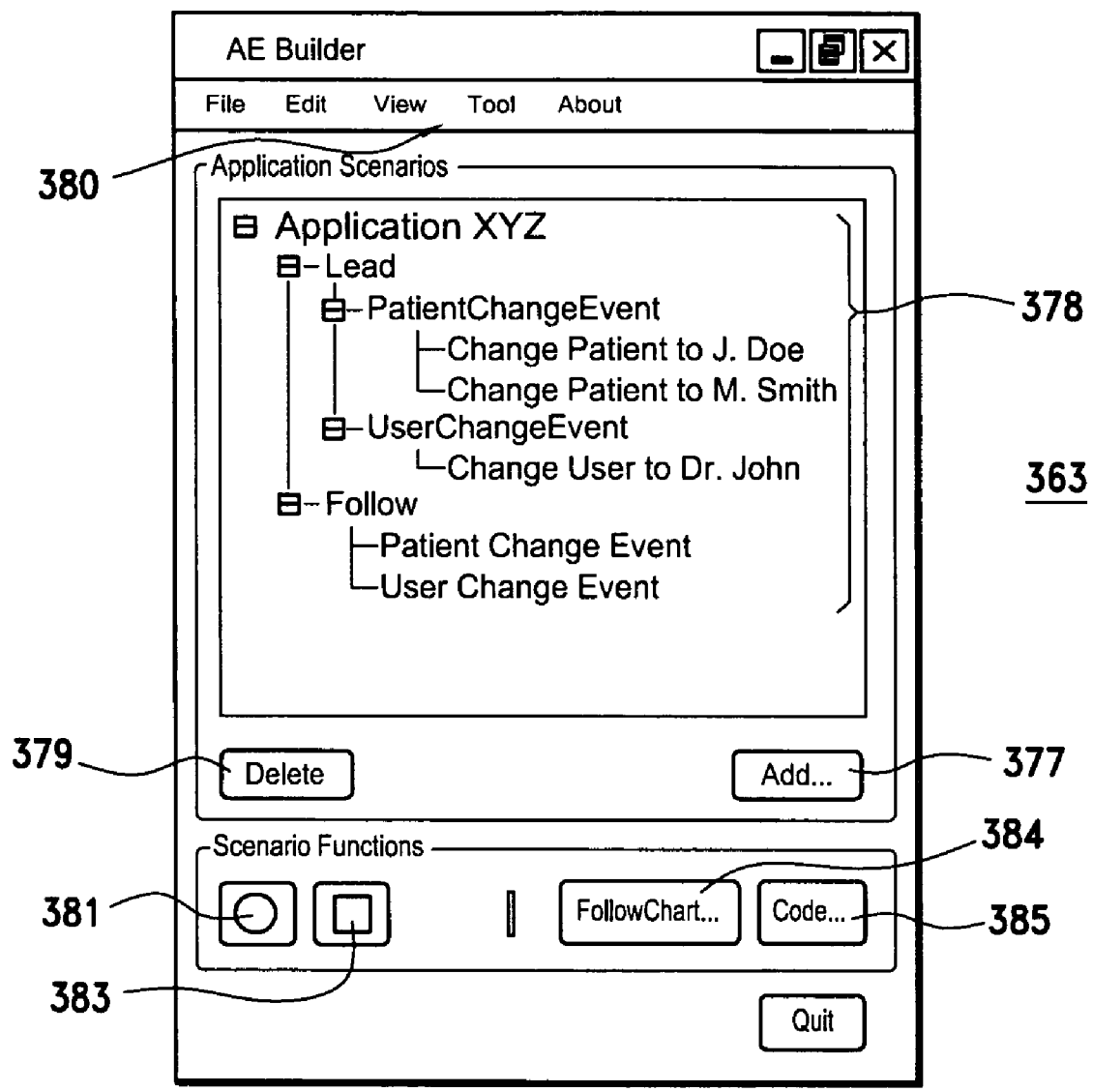
FIG. 3 illustrates a primary control window, according to the first embodiment.

As part of process 220, system 100 (FIG. 1) instructs user interface 102 (FIG. 1) to create a graphical user interface (GUI) 114 (FIG. 1) on the video screen of a computer. GUI 114 allows user 150 (FIG. 1) to configure system 100, to start and stop the process of recording user actions, and to edit the data objects and the source code. FIG. 3 illustrates a primary control window 363 according to the first embodiment. Window 363 is the main control panel for system 100 and is created as part of GUI 114.

In one embodiment, window 363 contains a list 378. List 378 can be a tree view of applications and scenarios. The top level of list 378 is the name of the application(s), such as application 152 (FIG. 1). In this example, the top level of list 378 contains the name of one application, "Application-XYZ." The next node down on list 378 can be the categories of events. In the example shown in FIG. 3, two event types, "Lead" and "Follow," have already been added to list 378. Each of these categories have two scenario types, "PatientChangeEvent" and "UserChangeEvent," each of which are already added under the categories. Under the "PatientChangeEvent" scenario type in the "Lead" branch, two different scenarios, "Change Patient to J. Doe" and "Change Patient to M. Smith," are listed. The "UserChangeEvent" scenario type includes one scenario "Change User to Dr. John."

In the same or different embodiment, to delete a scenario or application, user 150 (FIG. 1) highlights the scenario name on list 378 and clicks on a "Delete" button 379. As an example, when user 150 clicks on "Delete" button 379, a delete confirmation window can open where user 150 will confirm deletion of the selected scenario. When an application or scenario is deleted from list 378, system 100 deletes the information saved for that application or scenario. In one example, system 100 deletes all the information about the program including any generated data objects. In another example, the data objects, source code, and computer program are not deleted, but all other information about the scenario is deleted.

Referring back to FIG. 2, after launching system 100 (FIG. 1) during process 220, the next process 221 of method 200 is deciding whether to add an application/scenario. In one example, user 150 (FIG. 1) needs to determine whether application 152 (FIG. 1) and/or the scenario user 150 wants to record has already been added to list 378 (FIG. 3). If application 152 and the scenario has already been added, then user 150 can begin the recording process at process 223. If application 152 and/or the scenario has not been added, user 150 needs to add application 152 and/or the scenario during process 222 before beginning the recording process 223.

Figure 4:
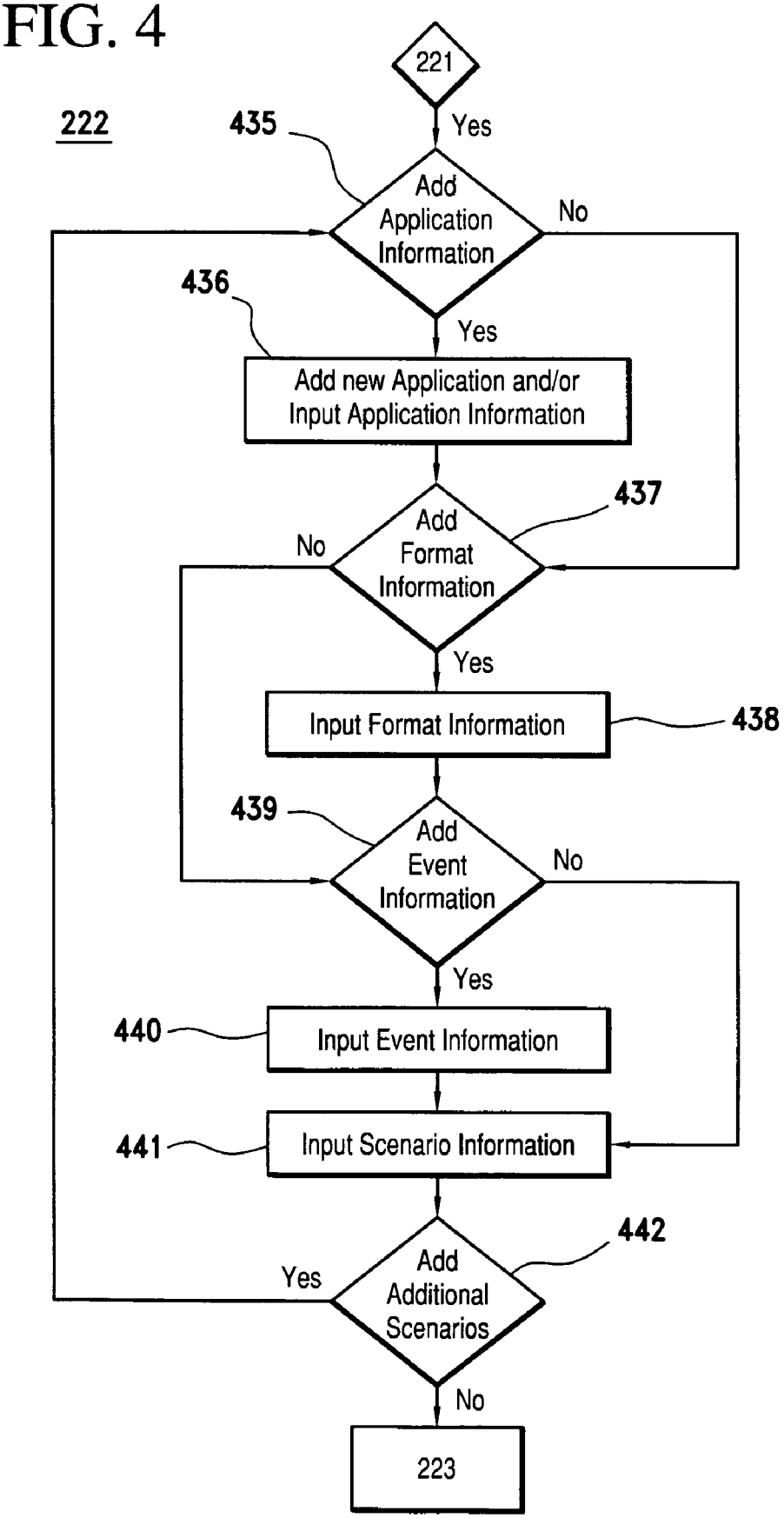
FIG. 4 illustrates a flow chart describing a process of adding a scenario, according to the first embodiment.

FIG. 4 illustrates a flow chart describing the process 222 (FIG. 2) of adding application 152 and/or a scenario. In one embodiment of FIG. 4, a first step 435 of process 222 is determining whether to input application information. If the information about application 152 (FIG. 1) has already been entered, then inputting application information is not necessary, and the next step of process 222 is step 437.

If the information for application 152 (FIG. 1) is needed, the next step 436 of process 222 of FIG. 4 is adding a new application and/or inputting application information. In one embodiment, user 150 (FIG. 1) can add a new application by clicking on the left button of the mouse and then by clicking on the "Add Application" item on a menu opened by clicking the left button of the mouse. In another embodiment, user 150 (FIG. 1) can add a new application by clicking on "Add" button 377 on window 363 (FIG. 3).

Figure 6:
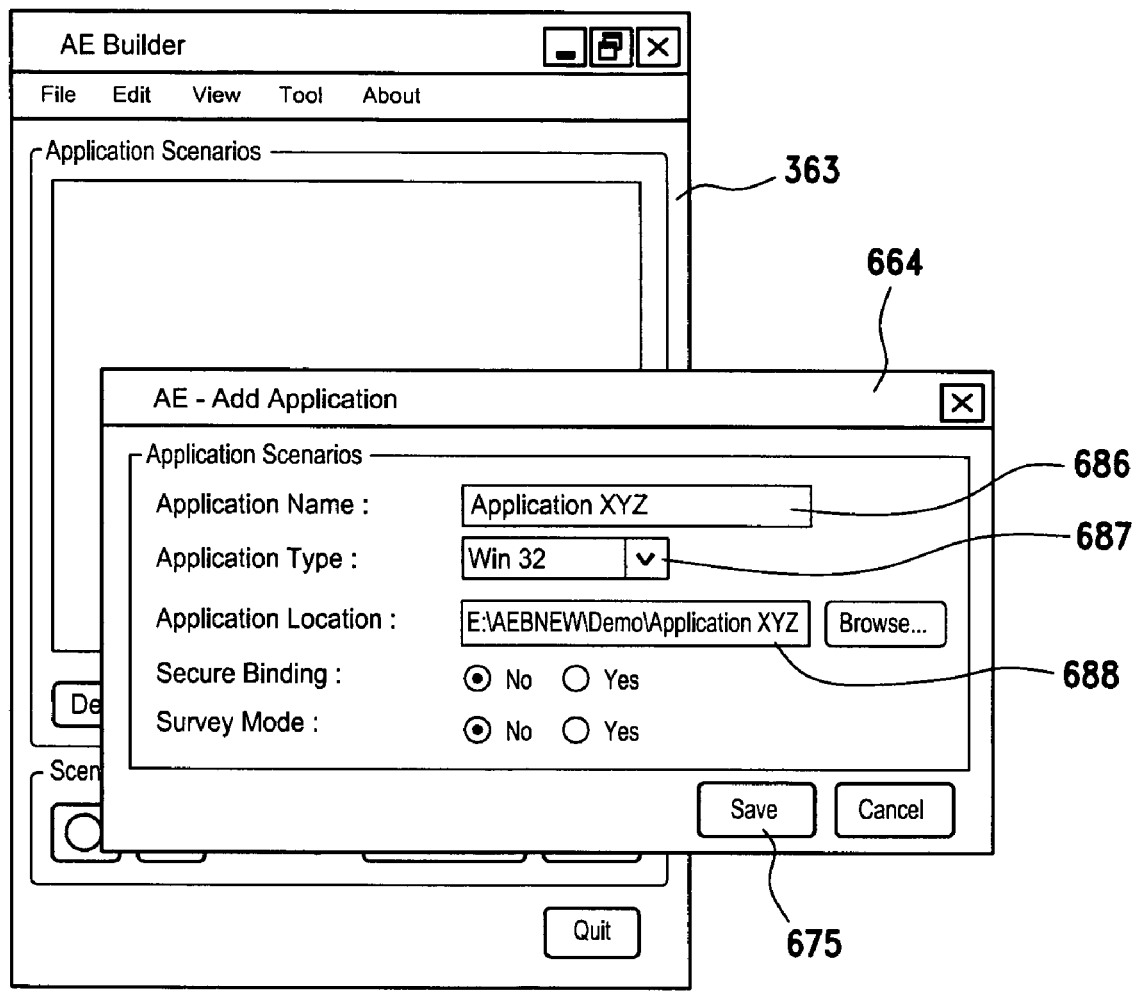
FIG. 6 illustrates the primary control window of FIG. 3 and an add application window, according to the first embodiment.

FIG. 6 illustrates window 363 and an add application window 664, according to the first embodiment. As an example, the process of adding a new application is begun by user 150 (FIG. 1) clicking on "Add" button 377 (FIG. 3). Clicking on "Add' button 377 (FIG. 3) can open window 664 in FIG. 6. In window 664, user 150 (FIG. 1) enters the information about application 152 (FIG. 1). In one embodiment, system 100 (FIG. 1) can require entering: the name of application 152 (FIG. 1) in a text box 686, the application type (e.g., Win32 application, Java application, Web application, etc.) in a drop down menu 687, and the storage location of the executable program for application 152 (FIG. 1) in a box 688. System 100 (FIG. 1) can also require user 150 (FIG. 1) to choose no/yes as to whether application 152 (FIG. 1) is using secure binding and no/yes as to whether application 152 (FIG. 1) runs in survey mode. It should be appreciated that window 664 is merely illustrative and that the information required by window 664 is not limited to this particular group of information, as numerous other embodiments are possible.

Secure bindings, in one embodiment, (1) ensures that the sender of the data is a valid sender, for example, a context participant joined to the common context; (2) the sender has permission to send or read the data; and (3) the data is not modified in transit.

During data transfers, when running in secure bindings mode, a message digest is included with the data, which is used to make sure the data was not modified. The message digest is hashed using a key that was exchanged during the secure binding setup between two communicating programs. If the receiver does not have the key or if the data has been modified, the message digest will indicate that the message has not been secured. In other embodiments, if user 150 (FIG. 1) does not care if this type of checking is performed, secure bindings can be turned off.

In one embodiment, when survey mode is on, an instigator (e.g. application 152 (FIG. 1) and/or user 150 (FIG. 1)) of a context change are allowed to determine if there are circumstances that might want to be considered before changing the context and if so, allowing the user 150 (FIG. 1) to be involved in the decision as to whether to change the context or not. When survey mode is off, foreign applications 153 (FIG. 1) must change context immediately when an instruction from application 152 (FIG. 1) is received.

Once user 150 (FIG. 1) has entered the information regarding application 152 (FIG. 1), user 150 clicks a "Save" button 675 in FIG. 6 to save the information and close window 664.

Referring back to FIG. 4, the next step 437 of adding a scenario is determining if it is necessary to add format information. In one embodiment, format information can be necessary when application 152 (FIG. 1) displays, saves, and/or passes information in a non-standard format. For example, application 152 can save the phone number for a patient in the format 1234567890 or (123) 456-7890. However, a standard or another application could require the format: 123-456-7890. In this example, user 150 would have to enter format information so the executable program created by system 100 (FIG. 1) converts the telephone number into the proper format before communicating the information to any foreign applications 153 (FIG. 1) that are foreign application-compliant. If user 150 has already input the format information or if entering format information is unnecessary, the next step of process 222 is step 439.

Figure 5:
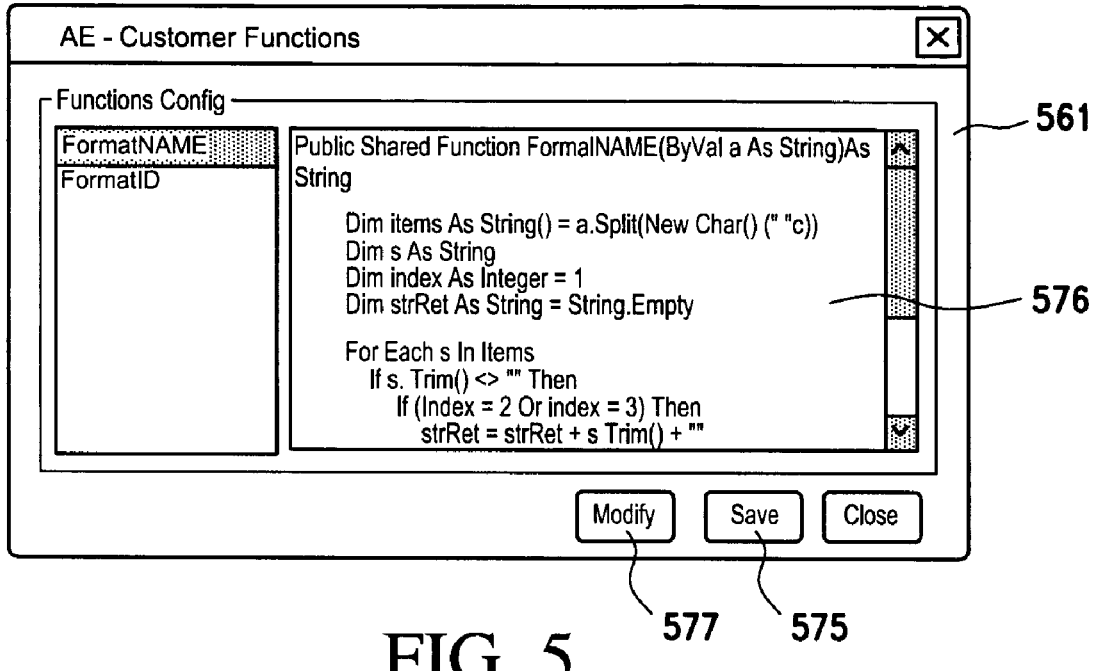
FIG. 5 illustrates a window for entering format information, according to the first embodiment.

If format information is necessary, however, the next step 438 of process 222, as shown in FIG. 4, is inputting format information. FIG. 5 illustrates a window 561 for viewing format information, according to the first embodiment. In one example, user 150 (FIG. 1) views computer functions or routines in a text window 576 in FIG. 5. The functions and routines entered must be capable of converting the data into the correct format. If the computer functions or routines displayed in text window 576 cannot properly covert the format, then user 150 (FIG. 1) can click on button 577 to open a window to modify the computer functions or routines. In another embodiment, user 150 (FIG. 1) is provided with a list of conversion information, and user 150 chooses the format of the information in application 152 (FIG. 1) and the format required by foreign applications 153 (FIG. 1). In yet another embodiment, system 100 (FIG. 1) automatically modifies the format of data when necessary. In this embodiment, steps 437 and 438 (FIG. 4) are unnecessary.

Turning back to FIG. 4, the next step 439 of process 222 is determining whether to add event configuration information. Event configuration information includes information about the type of event. In one embodiment, the event configuration information includes information about the context for events of this type. If the event confirmation information is not needed or has already been entered, then inputting event configuration information is not necessary, and the next step of process 222 is step 441.

Figure 7:
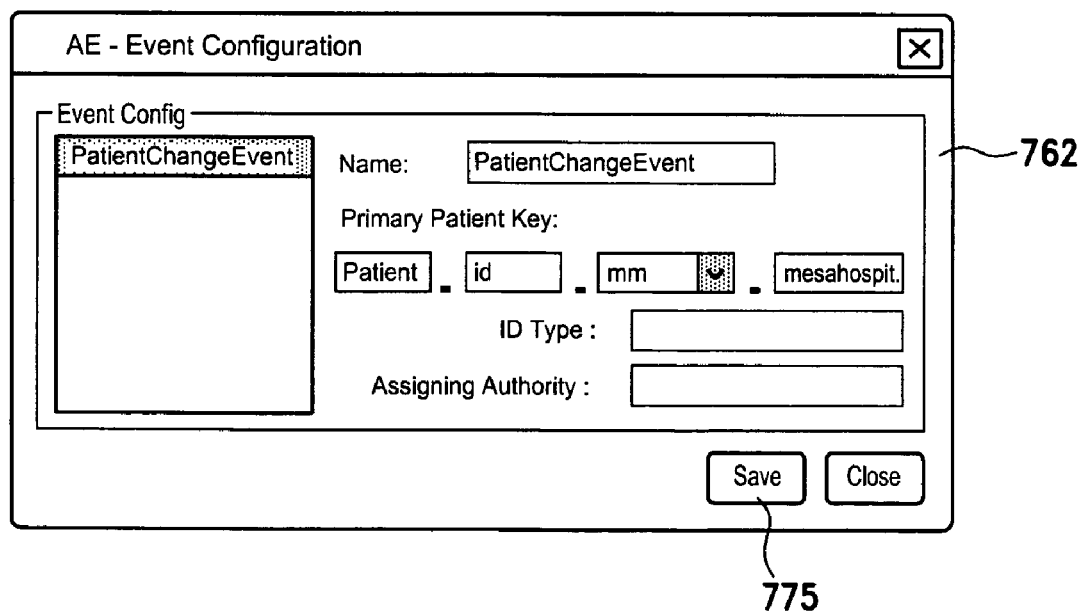
FIG. 7 illustrates a window for inputting event configuration information, according to the first embodiment.

If the event information needs to be added, the next step 440 of process 222 is inputting the event configuration information. FIG. 7 illustrates a window 762 for inputting event configuration information, according to the first embodiment. In the example shown in FIG. 7, window 762 is configured to allow inputting of information regarding the event of changing the patient. In window 762, user 150 (FIG. 1) can input the primary patient context and information about the format type and assigning authority for the context. After inputting the information, user 150 (FIG. 1) can click a "Save" button 775 to save the information and close window 762.

Figure 8:
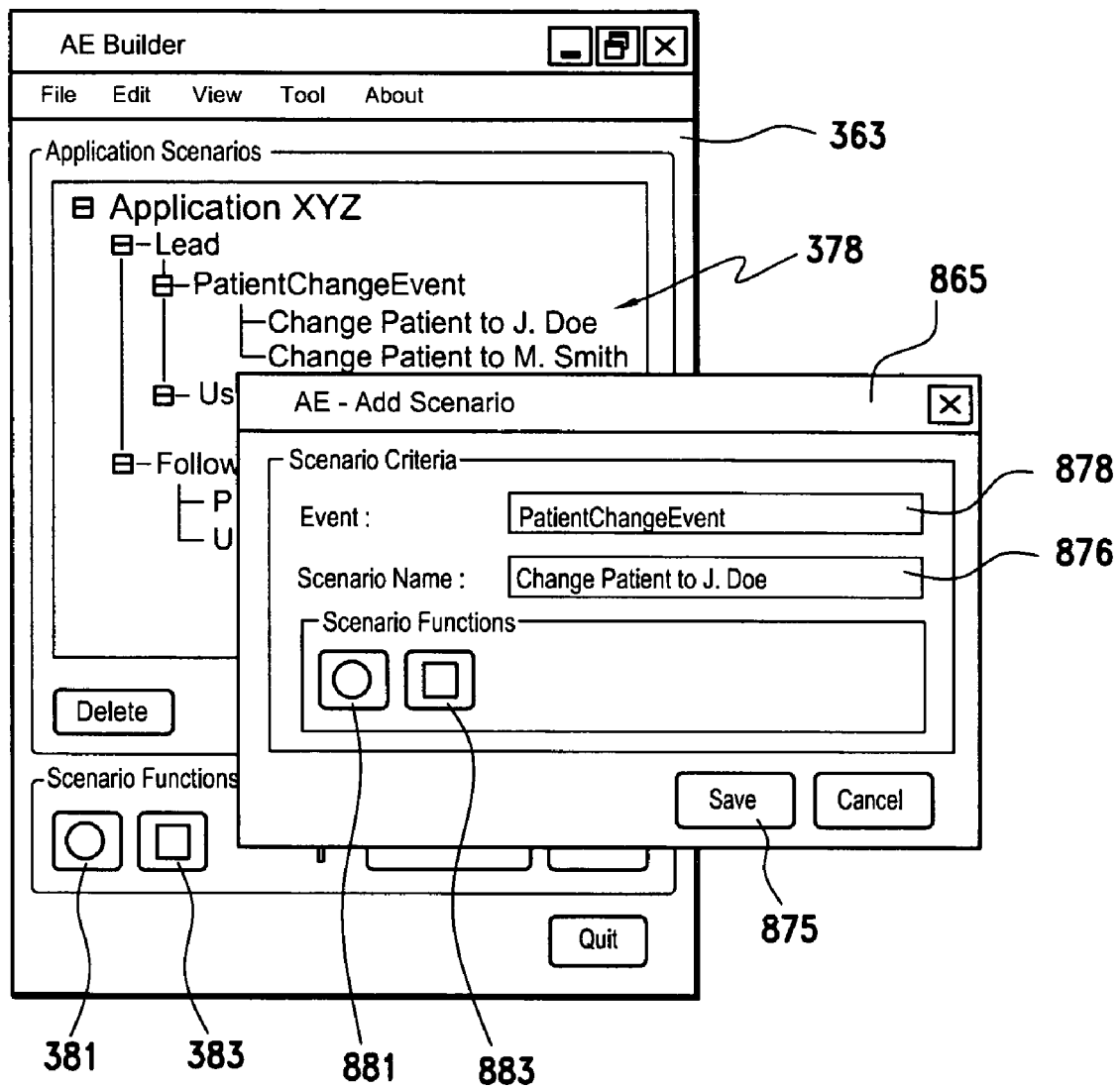
FIG. 8 illustrates the primary control window of FIG. 3 and an add scenario window, according to the first embodiment.

Referring back to FIG. 4, the next step 441 in process 222 is inputting scenario information. FIG. 8 illustrates window 363 and an add scenario window 865, according to the first embodiment.

In window 865, user 150 (FIG. 1) can enter the event name in a box 878 and the scenario name in a box 876. In one embodiment, user 150 (FIG. 1) can highlight an event node on list 378 before opening window 865, and the event name will automatically be added into box 878. After entering the scenario name and possibly the event name, user 150 (FIG. 1) can click on a "Save" button 875 to save the information and close window 865. The name of the scenario, entered in box 876, will be added under the correct event type node. If user 150 (FIG. 1) wants to add more scenarios (step 442 in FIG. 4), process 222 can be repeated until all of the additional scenarios have been added to list 378.

Figure 9:
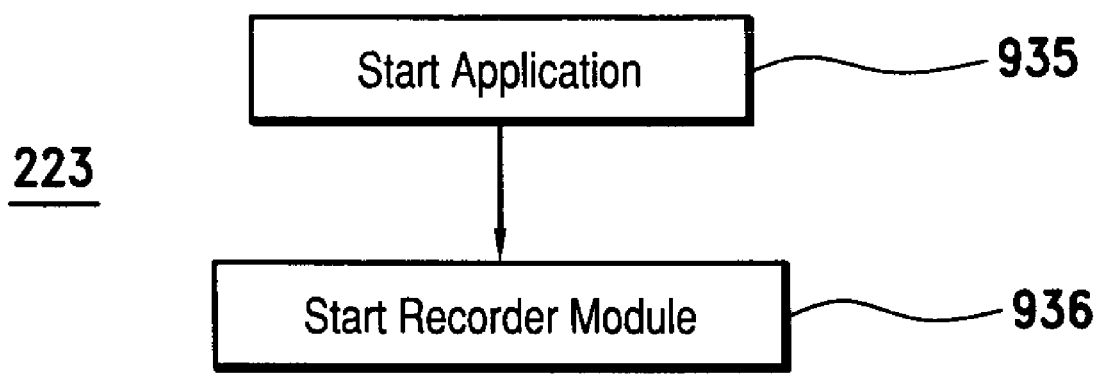
FIG. 9 illustrates a flow chart describing a process of beginning the recording process, according to the first embodiment.

Turning back to FIG. 2, the next process 223 in method 200 is beginning the recording process. FIG. 9 illustrates a flow chart describing the process of beginning the recoding process, according to the first embodiment.

In one embodiment, a first step 935 of process 223 is starting application 152 (FIG. 1). Application 152 can be launched by clicking on an icon on the desktop of operating system 151 (FIG. 1) or though a menu of operating system 151. Methods of starting applications on a computer are well known and will not be further described herein. In other embodiments, system 100 (FIG. 1) can automatically start application 152 (FIG. 1).

A second step 936 of process 223, as shown in FIG. 9, is starting recorder module 103 (FIG. 1). In one embodiment, user 150 (FIG. 1) highlights the scenario to be recorded on list 378 (FIG. 3) and clicks on record button 381 in window 363 of FIG. 3. In the same or different embodiment, user 150 (FIG. 1) can click on button 881 in window 865 of FIG. 8. When user 150 (FIG. 1) clicks on button 381 (FIG. 3) or button 881 (FIG. 8), recorder module 103 (FIG. 1) is activated. When recorder module 103 is activated, window 363 (FIG. 3) and all other active windows created by user interface 102 (FIG. 1) are minimized, in one embodiment. In the same or different embodiment, when the window 363 (FIG. 3) and the other windows are minimized, a recording window can be created by user interface 102.

Figure 10:
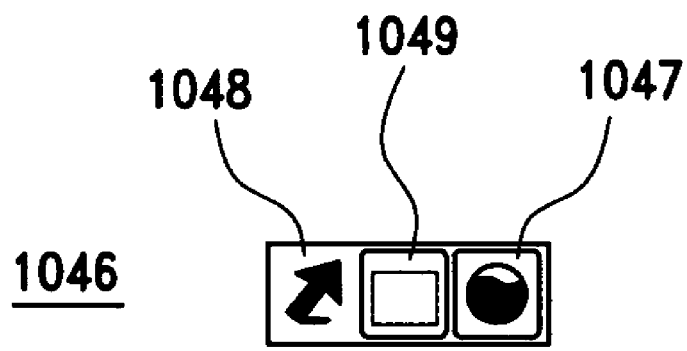
FIG. 10 illustrates a recording window, according to the first embodiment.

FIG. 10 illustrates a recording window 1046, according to the first embodiment. As an example, window 1046 can include an arrow button 1048, a select button 1049, and a return button 1047. Return button 1047, when clicked, will maximize or recreate window 363 (FIG. 3) and any other active windows created by GUI 114 (FIG. 1) to allow user 150 (FIG. 1) to stop the recording process.

Arrow button 1048 and select button 1049 can be used with applications that cannot be recorded directly. For example, VBTextlabel in the Microsoft Windows cannot be recorded directly so, instead, this method of recordation can be used. In these embodiments, user 150 (FIG. 1) can click on button 1049 and then drag button 1049 over a label for the program to be recorded. This program will then be recorded. If user 150 (FIG. 1) wanted to return to normal recording mode, user 150 can click arrow button 1048.

In another embodiment, instead of opening window 1046, all open windows related to system 100 (FIG. 1) are closed, and an icon is added to an icon tray of operating system 151 (FIG. 1). User 150 (FIG. 1) can click on the icon to restore the open windows related to application 152 (FIG. 1). In a further embodiment, all open window related to system 100 (FIG. 1) are minimized to the task bar of operating system 151 (FIG. 1).

After clicking on record button 381 (FIG. 3) or 881 (FIG. 8), user 150 (FIG. 1) performs the scenario in application 152 (FIG. 1) as it would normally be performed. For example, if user 150 is recording the scenario of logging into a database using application 152, user 150 will perform the steps necessary for logging into the database using the mouse, keyboard, and/or other input devices. Recorder module 103 (FIG. 1) will record at least a portion, if not all, of the actions of user 150. The actions recorded will include the actions necessary to allow an executable program generated by system 100 to repeat the scenario.

Figure 11:
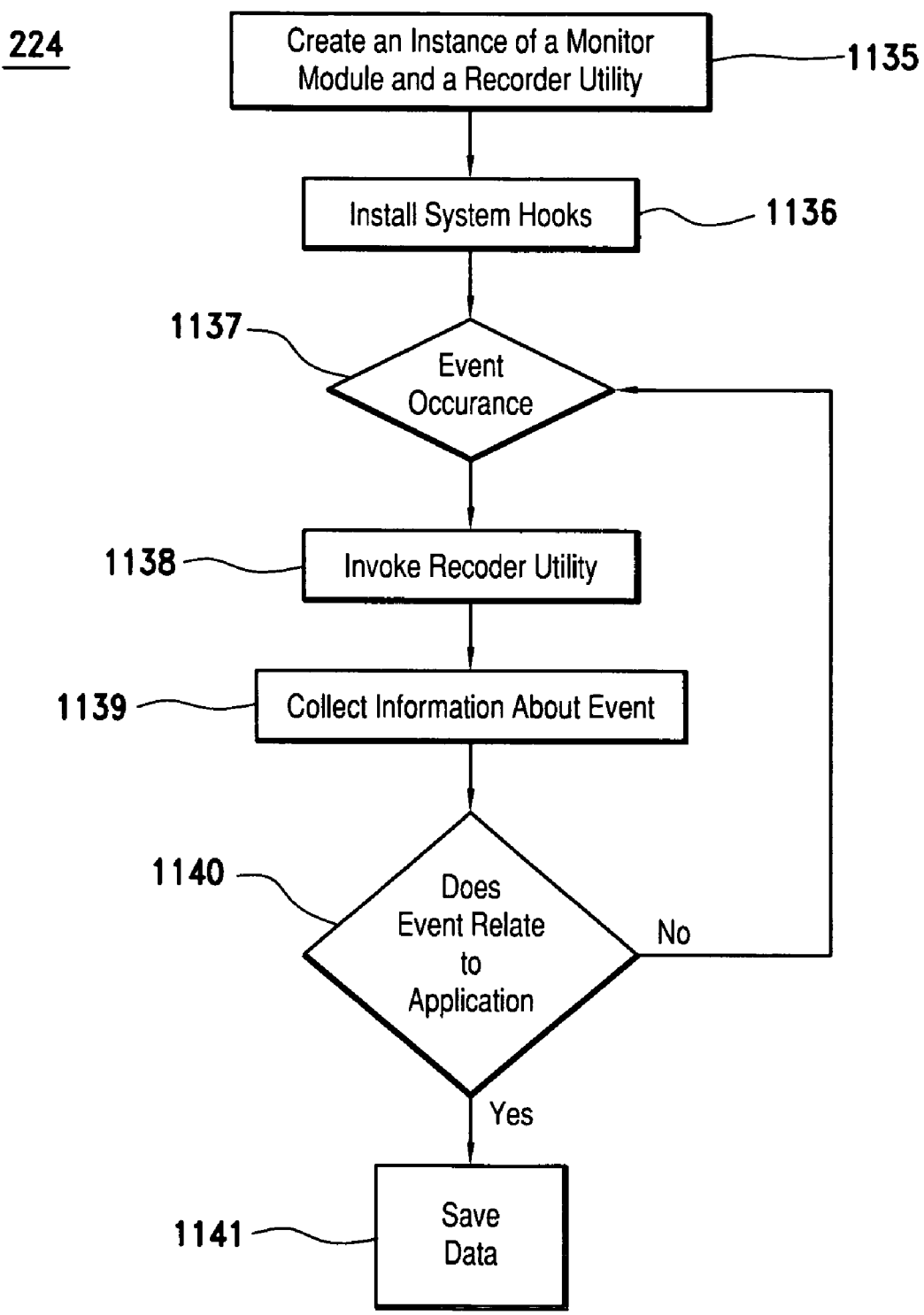
FIG. 11 illustrates a flow chart describing a process of recording the actions of the user, according to the first embodiment.

Once again referencing FIG. 2, the next process 224 in method 200 is recording the actions of user 150 (FIG. 1). FIG. 11 illustrates a flow chart describing the process of recording the actions of user 150, according to the first embodiment.

As one example, a first step 1135 of process 224 is creating an instance of monitoring module 115 (FIG. 1) and recorder utility 116 (FIG. 1). Monitor module 115 monitors for events caused by the actions of user 150 (FIG. 1). Recorder utility 116 captures the events identified by monitor module 115 and records at least a portion of the events.

In one embodiment, monitor module 115 (FIG. 1) installs system hooks 117 (FIG. 1) in the next step 1136 of process 224 in FIG. 11. Hooks 117 are programs that can monitor a keyboard, a mouse, and other input device for events. "Events," as used herein, refers to or otherwise includes any action by a user using an input device. Examples of events include pushing the left, right or center mouse buttons, moving the mouse, or pressing a key on the keyboard. In one example, hooks 117 are capable of monitoring the communication between the input devices and operating system 151 (FIG. 1) and reporting any events to monitor module 115.

Once hooks 117 (FIG. 1) have been installed, hooks 117 monitor for an occurrence of an event at step 1137 of process 224 in FIG. 1. Hooks 117 will notify monitor module 115 (FIG. 1) when an event has occurred. As an example, events that will cause hooks 117 to notify monitor module 115 include keystrokes on a keyboard or the click of a button on a mouse. In another embodiment, user 150 (FIG. 1) can configure what event types should be monitored through menus in window 363 (FIG. 3).

In one embodiment, when an event occurs, monitor module 115 (FIG. 1) invokes an instance of recorder utility 116 (FIG. 1) in the next step 1138 of process 224 in FIG. 11. Once invoked, recorder utility 116 collects data about the event from hooks 117 (FIG. 1), application 152 (FIG. 1), and operating system 151 (FIG. 1) in next step 1139 of process 224 in FIG. 11. In one embodiment, the data collected about the event includes the action of user 150 (FIG. 1), the object of the action of user 150, and the identifying information about the active window when the action occurred. For example, if user 150 clicks the left button of the mouse on a "Save" button in a dialog window, the data collected by recorder utility 116 can include a notation that the left button on the mouse was pressed, the x- and y-position of the mouse, identification information for the "Save" button press, and the name, title and process ID for the active dialog window. In another example, if user 150 (FIG. 1) types a letter into a dialog box, the data collected can include the text typed by user, the identification information about the dialog box, and the name, title, and process ID for the active text window.

In the same or different embodiment, recorder utility can combine multiple events that occur in a short period into a single event. For example, if user 150 (FIG. 1) presses multiple keystrokes on the keyboard within the same text box in the same window in a short period of time, recorder utility 116 (FIG. 1) can combine these multiple events in a single event. In another example, if user quickly clicks a button on a mouse twice, recorder utility 116 (FIG. 1) can combine the two single click events into one double click event. In a further example, if user 150 (FIG. 1) presses a special key on the keyboard (e.g., "Ctrl," "Shift," "or "Alt" keys) and then another key on the keyboard, recorder utility 116 can combine the two separate keystroke events in a single event.

In one embodiment, after collecting the information in step 1139 in FIG. 11, recorder utility 116 (FIG. 1) can decide whether the event is related to application 152 (FIG. 1) in step 1140 of process 224 in FIG. 11. As an example, recorder utility 116 can determine whether the event is related to application 152 by establishing what application spawned the window that was active when the event occurred.

In one embodiment, when operating system 151 (FIG. 1) uses threads, the active window can be a thread of application 152 (FIG. 1) or the operating system 151. Recorder utility 116 (FIG. 1) can use the ownership information of the thread to determine whether application 152 spawned the active window. In another embodiment, recorder utility 116 can query operating system 151 as to the ownership of the active window.

In a further embodiment, recorder utility 116 (FIG. 1) can use the information related to the position on the screen where the event occurred and determine control based on what application had control of that area of the screen. For example, if user 150 (FIG. 1) clicks a button on a mouse, monitor module 115 (FIG. 1) can determine the x- and y-coordinates of the mouse pointer on the screen when the click occurred and what application had control of that area of the screen.

In some embodiments, if the event is not related to application 152 (FIG. 1), recorder utility 116 (FIG. 1) does not save the information about the event, and recorder utility 116 goes into a waiting state until invoked again by monitor module 115 (FIG. 1).

If the event does not relate to application 152 (FIG. 1), then process 224 can resume with step 1137 in FIG. 11. If, however, the event does relate to application 152 (FIG. 1), the next step 1141 of process 224 in FIG. 11 is saving the data. For lead events, the data recorded at step 1141 by recorder utility 116 (FIG. 1) can include the action of user 150 (FIG. 1), the element selected or modified by the actions of user 150, and possibly also the top-level window containing this element. For following events, the data recorded at step 1141 by recorder utility 116 include the actions of user 150, the element of the object of the action, and the active window. The information recorded includes (a) user actions for application 152 in the scenario; (b) operating system information related to the user actions and the scenario; and (c) information about application 152 that is related to the user actions and the scenario. The data is saved in memory and will be used by correlative action module 104 to create the data objects and/or code generation module 105 to create the source code. In other embodiments, different data can be recorded.

Furthermore, recorder utility 116 (FIG. 1) does not have to save data about every event related to application 152 (FIG. 1). For example, if a user opens a menu in application 152 but does not click on any items on the menu, then recorder utility 116 might not save the data about the event. In another example, recorder utility 116 might not save information if user 150 (FIG. 1) hits the tab key while a text box is active.

In a different embodiment, recorder utility 116 (FIG. 1) saves data about every event. In this embodiment, user 150 (FIG. 1) or another person can remove the unnecessary event later in method 200 (FIG. 2).

In one embodiment, multiple instances of steps 1137-1141 in FIG. 11 can occur simultaneously. For example, multiple instances of recorder utility 116 (FIG. 1) can be invoked by monitor module 115 (FIG. 1) and can run simultaneously if multiple events occur.

Referring back to FIG. 2, the next process 225 in method 200 is stopping the recording process. Stopping the recording process occurs when user 150 (FIG. 1) has completed the scenario. In one embodiment, user 150 clicks on stop button 383 in window 363 (FIG. 3) or stop button 883 in window 865 (FIG. 8) to stop the recording process. In other embodiments, the recording process can end automatically when user 150 quits application 152 (FIG. 1). After the recording process has ended, monitor module 115 (FIG. 1) uninstalls hooks 117 (FIG. 1) and release resources used during the recording process.

Figure 12:
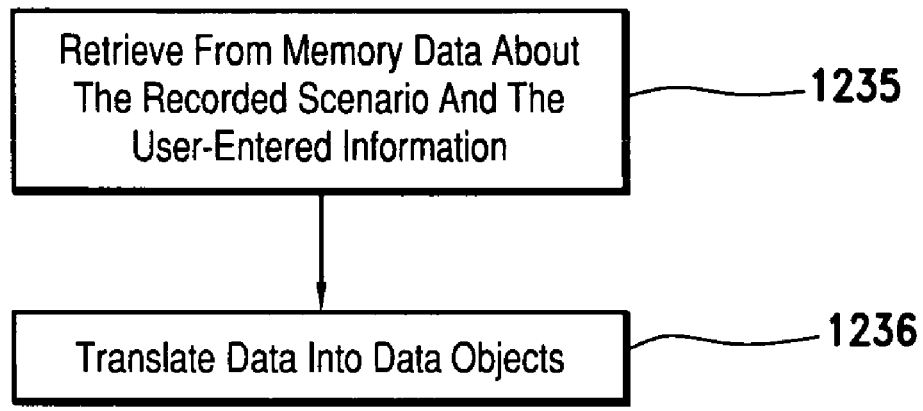
FIG. 12 illustrates a flow chart describing a process of generating data objects, according to the first embodiment.

Referring again to FIG. 2, the next process 226 in method 200 is generating data objects. FIG. 12 illustrates a flow chart describing the process 226 of generating data objects, according to the first embodiment. In the embodiment shown in FIG. 12, a first step 1235 of process 226 is retrieving from memory the data about the recorded scenario and the user-entered information. In one embodiment, the user-entered information includes the information entered in process 222 (FIG. 4) and is retrieved by correlative action module 104 (FIG. 1).

After retrieving the data and user-entered information, the next step 1236 of process 226 in FIG. 12 is generating data objects. As an example, the data objects can be generated by translating the data and user-entered information. The translation of the data is performed by correlative action module 104 (FIG. 1). For example, correlative action module 104 can convert the data and user-entered information into XML (extensive mark-up language) code. The XML code can be stored in one or more human-readable files. In other embodiments, the data objects can be written in other languages or formats. For example, step 1236 in FIG. 12 could convert the data into PERL (Practical Extraction and Report Language), Python, Tcl/Tk (Tool Command Language with Tk GUI toolkit), or any Standard Generalized Markup Language (SGML) code.

Figure 13:
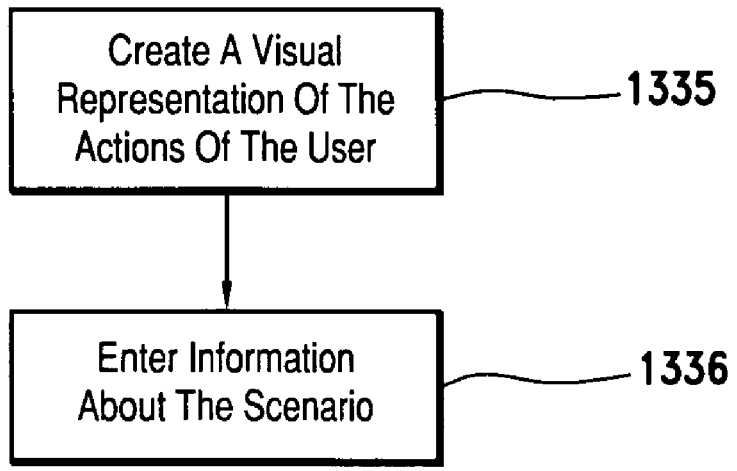
FIG. 13 illustrates a flow chart describing a process of entering additional information about the recorded scenario, according to the first embodiment.

Referring back to FIG. 2, the next process 227 in method 200 is entering additional information about the recorded scenario. FIG. 13 illustrates a flow chart describing the process 227 of entering additional information about the recorded scenario, according to the first embodiment. In one embodiment, visualization module 107 (FIG. 1) is instructed by recorder module 103 (FIG. 1) or correlative action module 104 (FIG. 1) to gather additional information about the recoded scenario and pass all information and data related to the scenario to code generation module 105 (FIG. 1). Visualization module 107 can include a modification module 118 (FIG. 1) capable of modifying the data or data objects for the actions of user 150 (FIG. 1) by allowing edits to the visual representation of the data.

Figure 14:
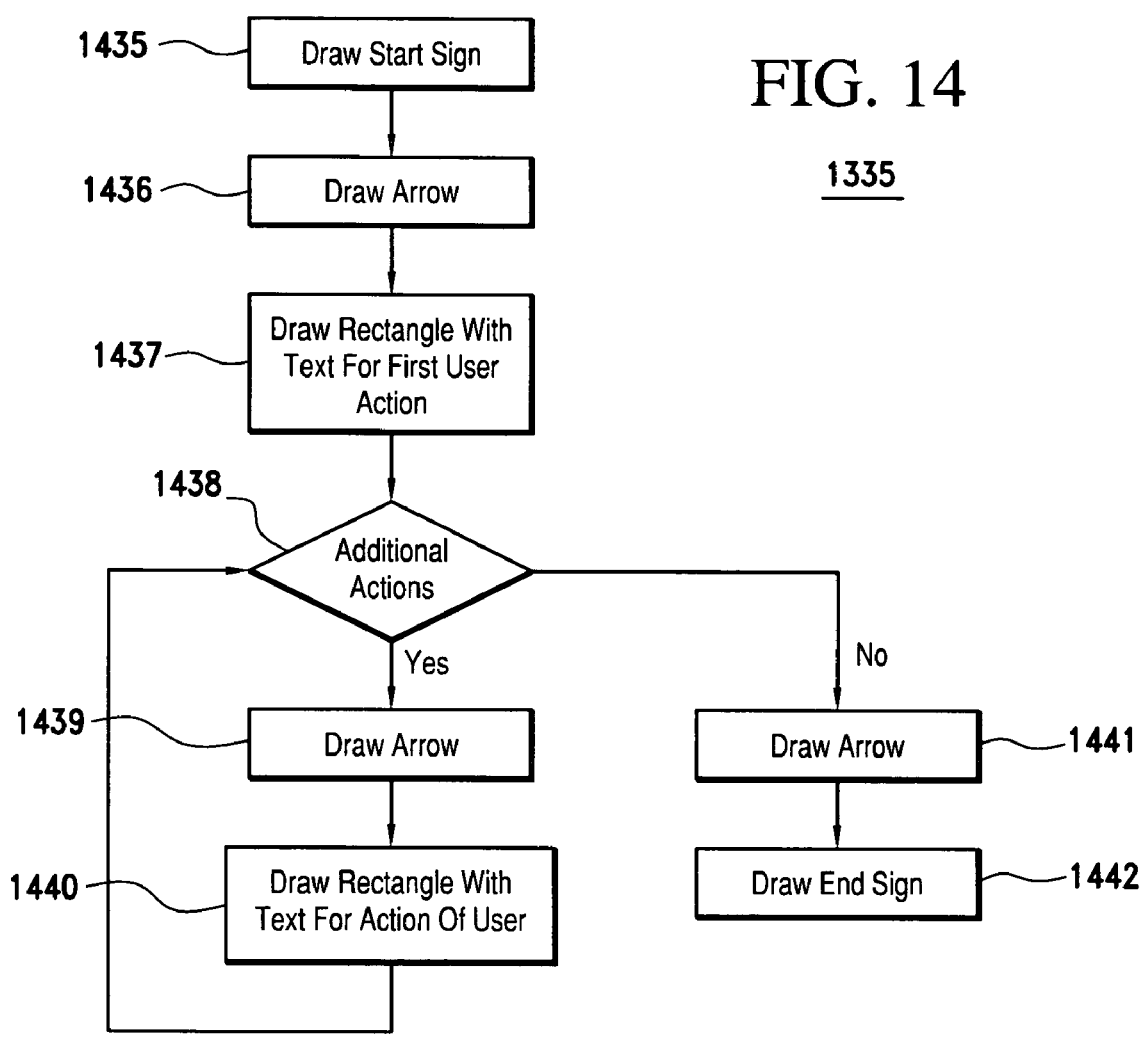
FIG. 14 illustrates a flow chart describing a step of creating a visual representation of the actions of the user, according to the first embodiment.
Figure 15:
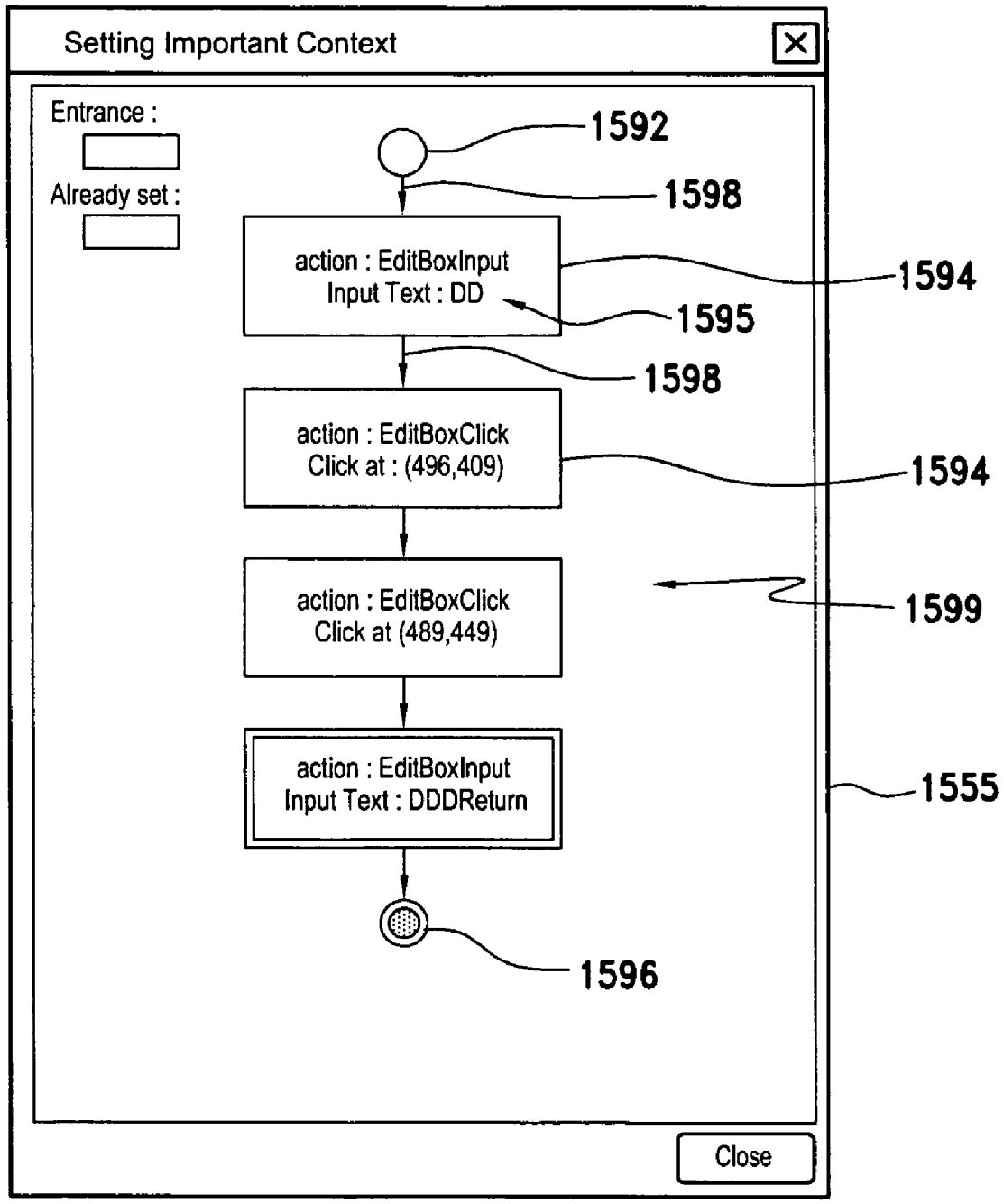
FIG. 15 illustrates a window containing an editable flow chart, according to the first embodiment.

In one embodiment, a first step 1335 of process 227 is creating a visual representation of the actions of user 150 (FIG. 1). FIG. 14 illustrates a flow chart describing the step 1335 of generating a visual representation of the data objects, according to the first embodiment. In one embodiment, the visual representation of the data is a flow chart. FIG. 15 illustrates a window 1555 containing an editable flow chart 1599, according to the first embodiment. In this example, window 1555 is created by user interface 102 (FIG. 1), as part of GUI 114 (FIG. 1) based on instructions from visualization module 107 (FIG. 1). In another embodiment, visualization module 107 creates window 1555.

Referring back to FIG. 14, the first two procedures 1435 and 1436 in step 1335 are drawing start sign 1592 (FIG. 15) and an arrow 1598 (FIG. 15), respectively in flow chart 1599 (FIG. 15). In one embodiment, a graphics module 109 (FIG. 1) draws the start sign, arrow, and other elements in flow chart 1599.

The next procedure 1437 in step 1335 in FIG. 14 is drawing a rectangle with the text describing the first user action in the scenario. In one embodiment, visualization module 107 (FIG. 1) parses the data objects created by correlative action module 104 (FIG. 1) to determine the first user action. In other embodiments, other modules in system 100 (FIG. 1) parse the data objects and pass the list of user actions to the visualization module 107. In still other embodiment, the visualization module 107 or another module uses the data generated during the recording process to determine the first user action in the scenario. After determining the first user action, graphics module 109 (FIG. 1) draws a box 1594 (FIG. 15) containing text 1595 (FIG. 15) which corresponds to the first user action.

Referring again to FIG. 14, the next procedure 1438 in step 1335 is determining if there are any additional actions in the scenario. As an example, visualization module 107 (FIG. 1) can parse the data objects to determine the next step in the scenario. If there is another action in the scenario, the next two procedures 1439 and 1440 in FIG. 14 are drawing another arrow 1598 (FIG. 15) and drawing another box 1594 (FIG. 15) with the text describing the second user action in the scenario. Procedures 1439 and 1440 are repeated until every user action described in the data objects has been added to flow chart 1599 (FIG. 15). After the last action of user 150 (FIG. 1) is added to flow chart 1599, the last two procedures 1441 and 1442 (FIG. 14) of drawing another arrow 1598 (FIG. 15) from the box contain text for the last user action and drawing an end sign 1596 (FIG. 15) are performed.

In some embodiments, user 150 (FIG. 1) can change text 1595 (FIG. 15) without changing the action related to that text. For example, the text "action: EditBox Input Input Text DD" in box 1594 (FIG. 15) could be changed to "Typed DD into window" without changing the related action.

Figure 16:
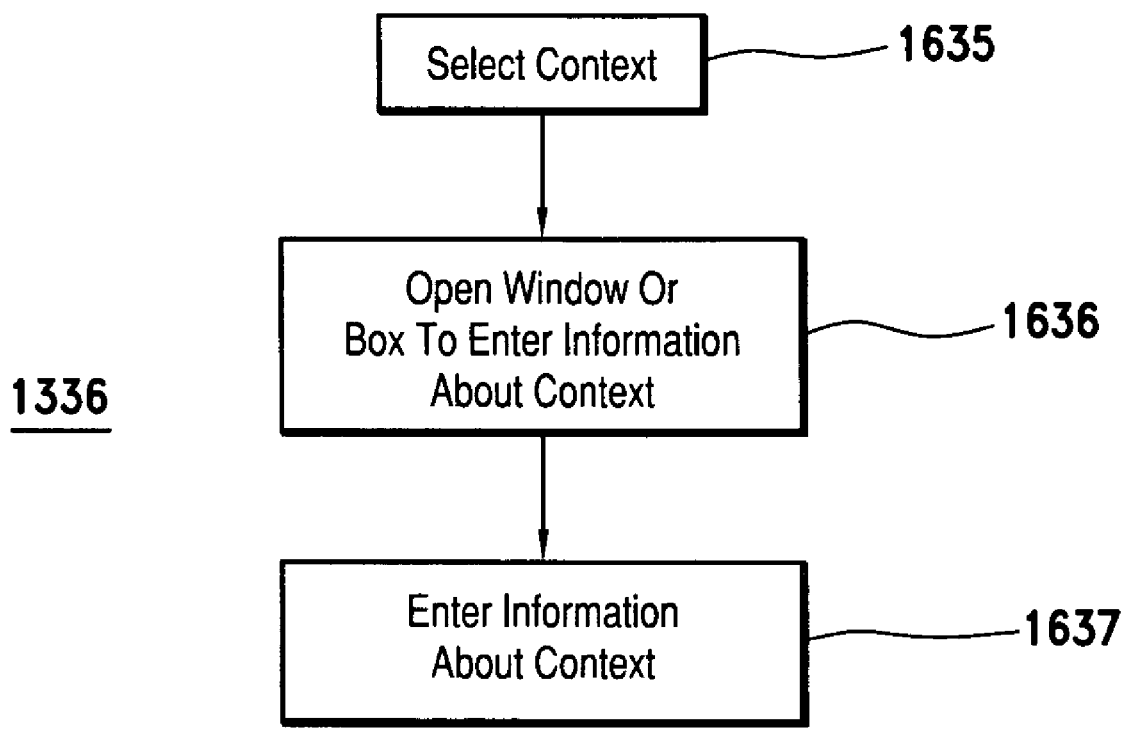
FIG. 16 illustrates a flow chart describing a step of entering information about the scenario, according to the first embodiment.

Now referring back to FIG. 13, the next step 1336 of process 227 is entering information about the scenario. For example, user 150 (FIG. 1) can use the flow chart 1599 (FIG. 15) generated in step 1335 in FIG. 13 to select the important fields and enter the information about the scenario. FIG. 16 illustrates a flow chart describing the step 1335 of entering information about the scenario, according to the first embodiment.

The first procedure 1635 of step 1336 in FIG. 16 is selecting the context. As an example, user 150 (FIG. 1) can select and highlight the box 1594 (FIG. 15) containing the context. After user 150 selects the context, the next procedure 1636 of step 1336 in FIG. 16 is opening a window or box to enter information about the context. As an example, user 150 can click the right button of the mouse after highlighting the box containing the context to open a menu, which allows user 150 to select the option of setting the context.

Figure 17:
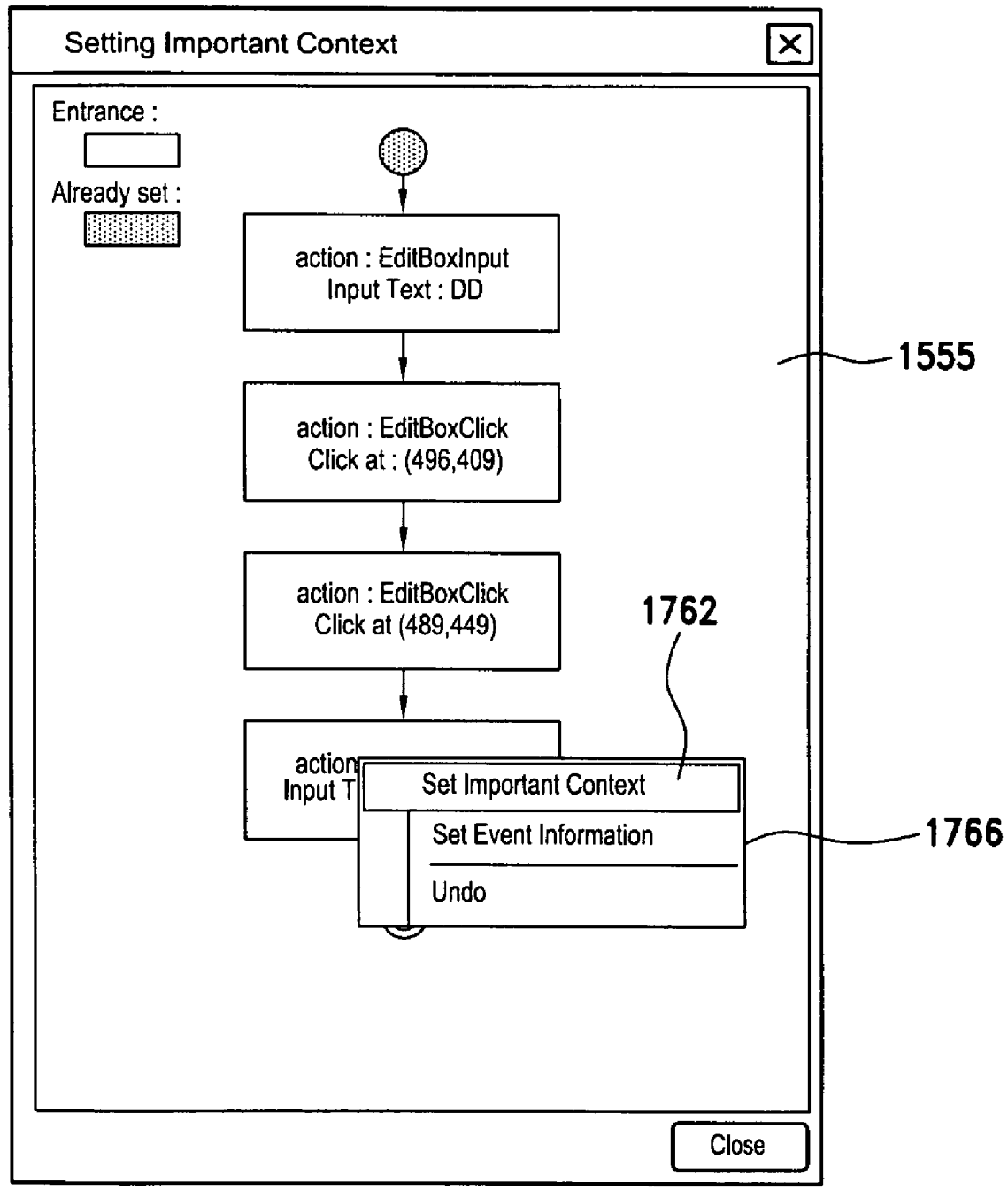
FIG. 17 illustrates the window of FIG. 15 and a menu for selecting a context, according to the first embodiment.

FIG. 17 illustrates window 1555 and a menu 1766 for selecting the context, according to the first embodiment. Menu 1766 contains an option 1762 of "set important context." In the example, user 150 (FIG. 1) can select option 1762 to open a dialog box to enter the information.

Figure 18:
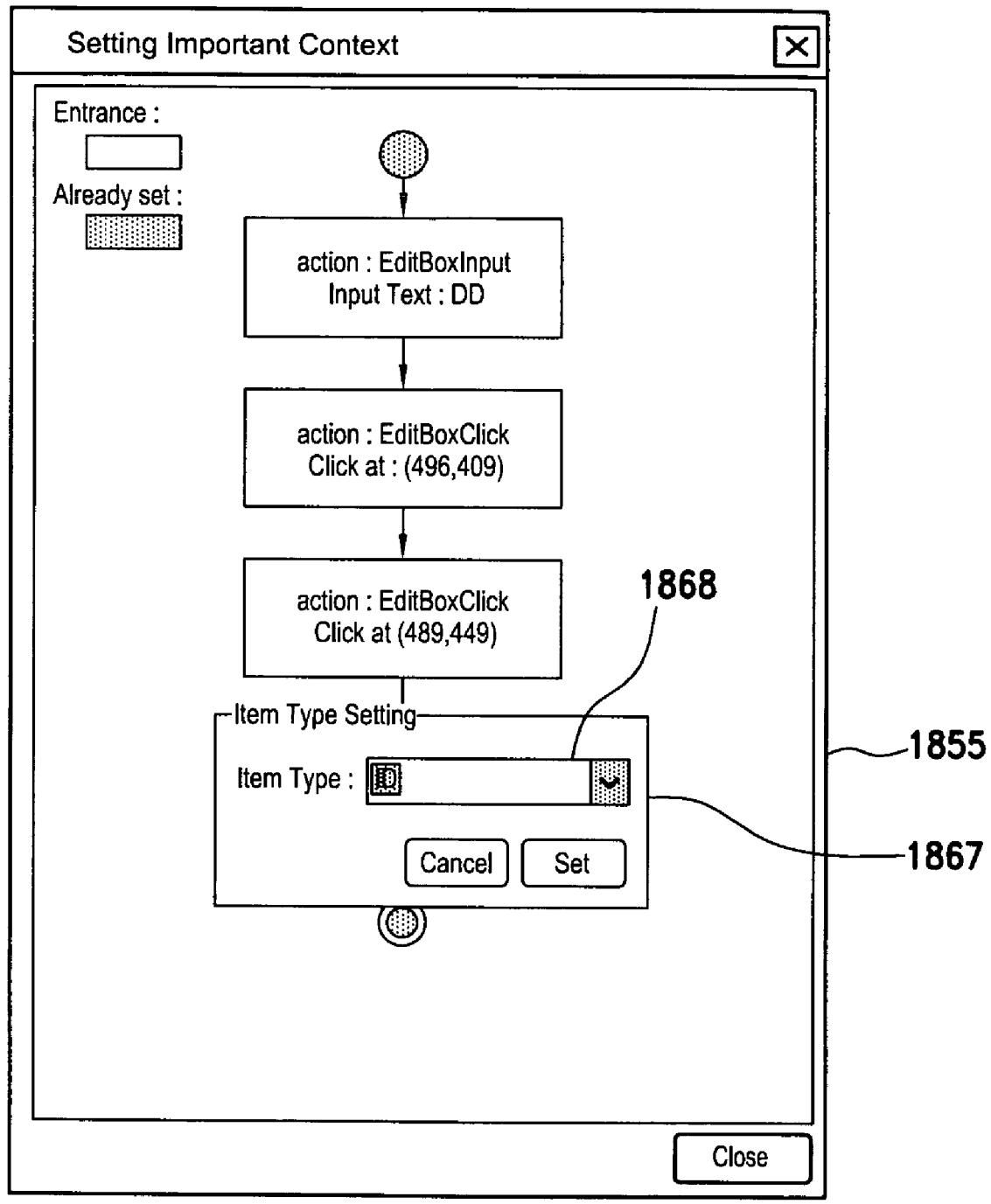
FIG. 18 illustrates windows of FIG. 15 with a box for entering information about the context in a follow scenario, according to the first embodiment.
Figure 19:
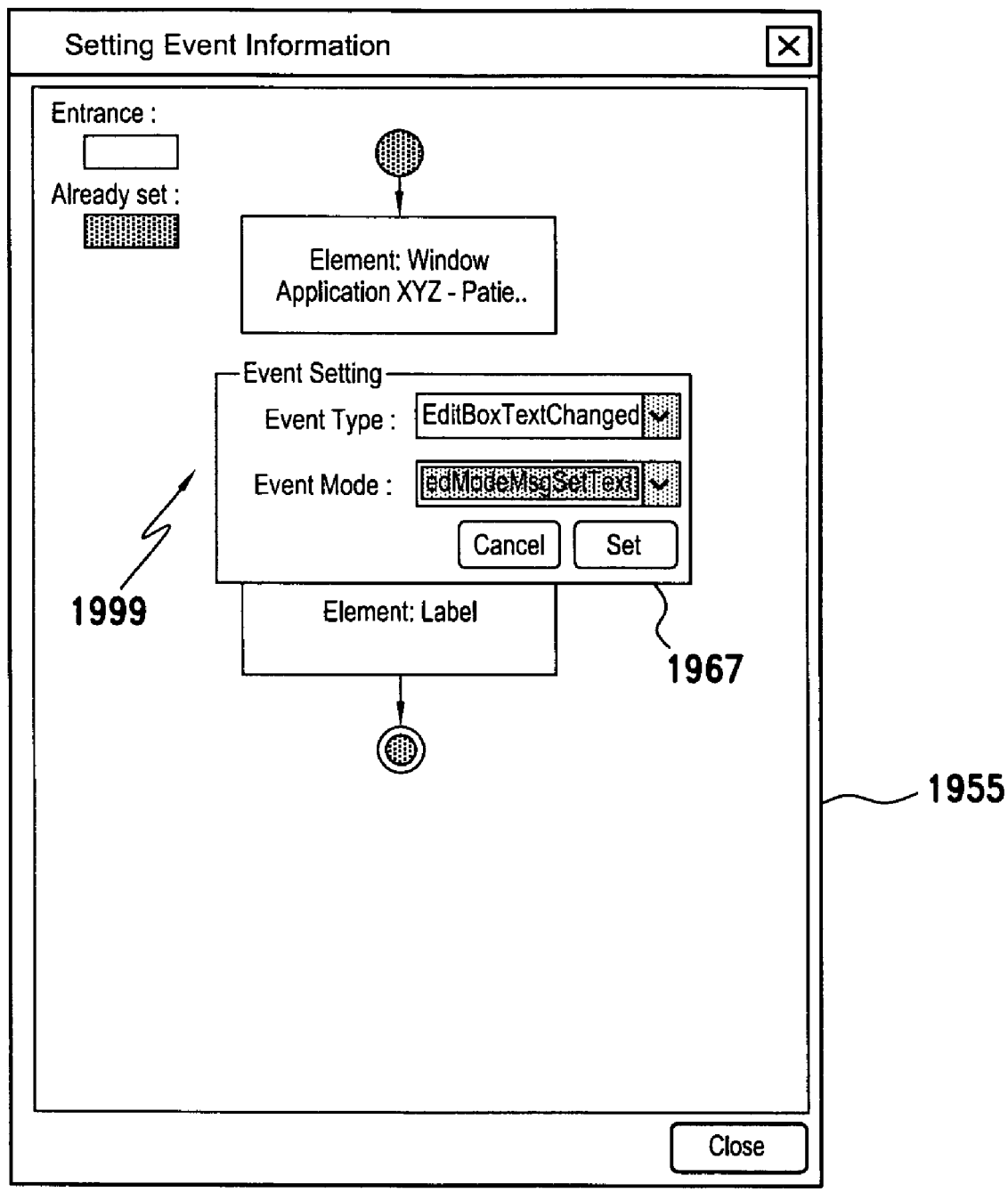
FIG. 19 illustrates a window for entering information about the context in a lead scenario, according to the first embodiment.

Returning to FIG. 16, the next procedure 1637 of step 1336 is entering information about the context. In one embodiment, a dialog box replaces the box containing the context on flow chart 1599 in FIG. 15. In this dialog box, user 150 (FIG. 1) can enter the information about the context. FIGS. 18 and 19 illustrate windows 1855 and 1955, respectively, with text or dialog boxes 1867 and 1967, respectively, for entering information about the context for follow and lead scenarios, respectively.

In FIG. 18, the box containing the context has been replaced with dialog box 1867. In box 1867, user 150 (FIG. 1) can select the item type from a pull-down menu 1868. The item type can correspond to a predefined item type or custom item types. Examples of item types include: ID, name, or encounter.

In FIG. 19, an example of a flow chart 1999 for a lead scenario with one of the boxes replaced with a text or dialog box 1967 is shown. In this example, user 150 (FIG. 1) can enter information about the scenario in dialog box 1967. In dialog box 1967, the event type and the event mode can be entered. Some example of possible event types include: change text of an edit box (EditBoxTextChanged); change selection in a list box (ListBoxSelectionChanged); change selection in a combo box (ComboBoxSelectionChanged); change text of a label (LabelTextChanged); create window (WindowCreate); destroy window (windowDestroy); activate window (WindowActivate). Some examples of possible event modes associated with changing the text of an edit box include: lose focus (edtModeLostFocus), enter edit mode (edtModeEnter), and set text (edtModeMsgSetText).

In further embodiments, other visual representation or even text lists can be used to enter the information about the scenario in process 227 in FIG. 2. For example, visualization module 107 (FIG. 1) or user interface module 102 (FIG. 1) can create a window with a list of the user actions. User 150 (FIG. 1) can select the important step from this list, and based on these selections, new dialog boxes are opened in which user 150 or another person can enter the information.

In some scenarios it is possible to have more than one context. In these scenarios, after providing the information for the first scenario, user 150 (FIG. 1) can enter information about the other contexts using the same procedure outlined for step 1336 (FIG. 16) in conjunction with FIGS. 18 and 19. In one embodiment, after the information about a context has been entered, the box containing the context changes color.

Figure 20:
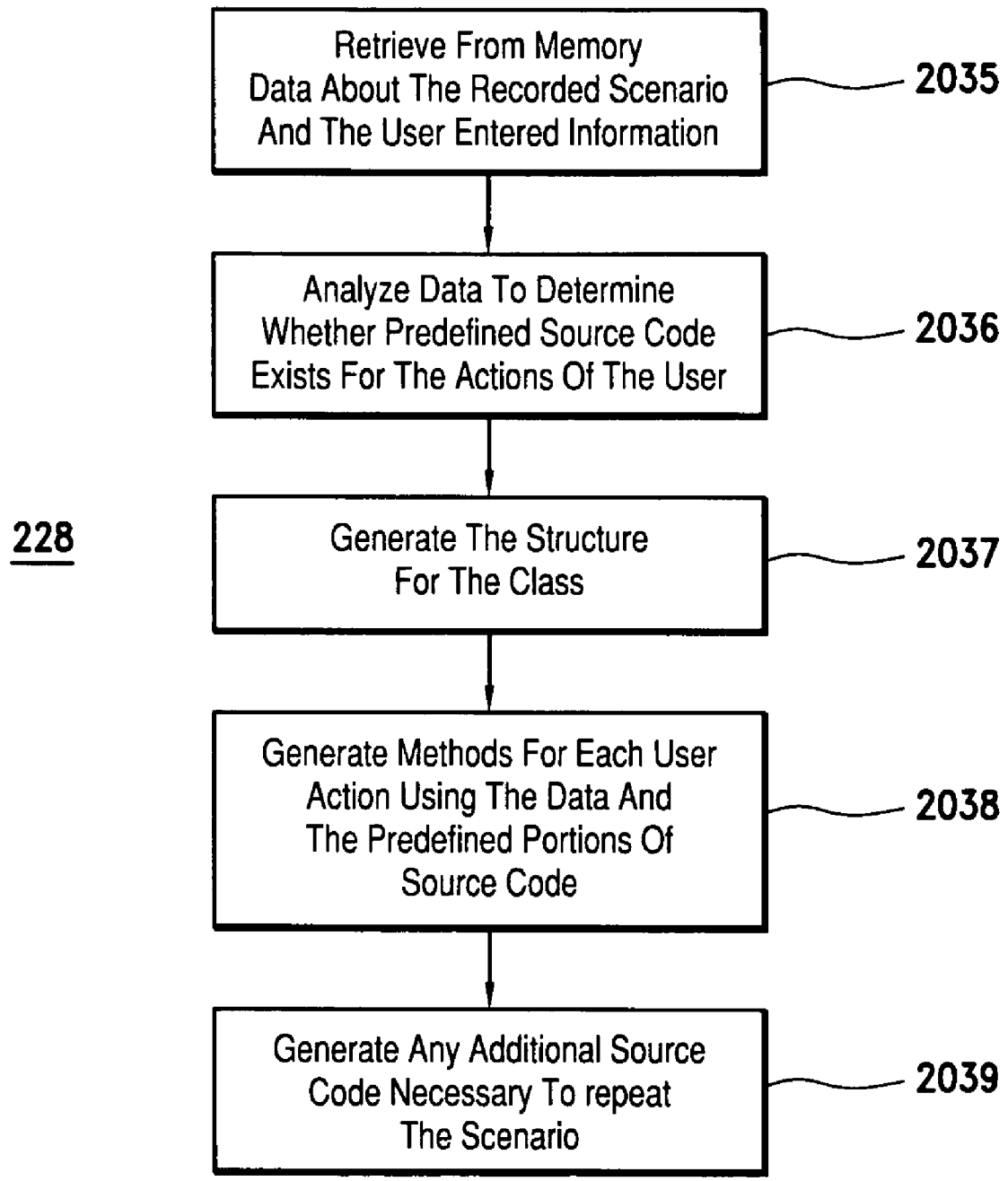
FIG. 20 illustrates a flow chart describing a process of generating source code, according to the first embodiment.

Referring back again to FIG. 2, the next process 228 of method 200 is generating source code. FIG. 20 illustrates a flow chart describing the process 228 of generating source code, according to the first embodiment. Code generation module 105 (FIG. 1) is capable of generating source code for the computer program using the recorded data or the data objects, the information gathered in steps 222 and 227 in FIG. 2, and the predefined portions of source code.

In one embodiment, the source code generated by process 228 in FIG. 2 is written in a programming language that uses classes. For example, code generation module 105 (FIG. 1) can generate C++, Java, Visual Basic, or other object oriented language source code. The use of classes can accelerate development by reducing redundant code entry, testing, and bug fixing. Additionally, using classes simplifies the relationships of interrelated data. With classes, related methods and items can simply inherit most of their functionality and data structures from the class. In other embodiments, the source code can be written in a programming language that does not support classes, like C or Fortran.

The process 228 in FIG. 2 described herein, will be an embodiment for generating source code using a programming language that supports classes. It should be understood that this embodiment is merely exemplary and that the source code can also be generated in programming languages that do not support classes or similar structures.

In the embodiment shown in FIG. 20, a first step 2035 of process 228 is retrieving from memory the data about the recorded scenario and user-entered information about the scenario. The user-entered information retrieved from memory for step 2035 can be information entered in process 222 and 227 (FIG. 2). The data and information can be retrieved by the code generation module 105 (FIG. 1). In another embodiment, code generation module 105 (FIG. 1) uses the data objects created in process 226 (FIG. 2), instead of data about the scenario stored in memory.

The next step 2036 of process 228 in FIG. 2 is analyzing the data to determine whether predefined source code exists for the actions of user 150 (FIG. 1). As an example, code generation module 105 (FIG. 1) extracts a list of the user actions during the scenario from the data and compares the list of user action to a description of the predefined portions of source code. In one embodiment, code generation module 105 will attempt to dynamically create source code for a particular action if predefined source code does not exist for the particular action or event. In another embodiment, if no predefined portion of code exists for a particular action, system 100 (FIG. 1) will return an error message.

In one embodiment, storage module 112 (FIG. 1) stores predefined portions of source code. As an example, the predefined portions of source code in storage module 112 can be stored in a memory device. The predefined portions of source code correspond to potential user actions. In one embodiment, storage module 112 contains predefined source code for all potential actions of user 150 (FIG. 1) using certain input devices. For example, a predefined portion of source code to replicate user 150 clicking a mouse button can exist in storage module 112. Other examples of user actions for which predefined source code can exist in storage module 112 includes movements of a mouse and also includes keystrokes on the keyboard, such as key combinations with special keys. In other embodiments, storage module 112 can include predefined portions of source code for other input device including joysticks, microphones, and touch screens.

Framework module 106 (FIG. 1) within storage module 112 contains predefined portions of source code, which facilitate communication between the generated computer program and one or more of foreign applications 153 (FIG. 1). In one embodiment, the portions of source code stored in framework module 106 are specifically designed for use with one communication protocol or standard. As an example, framework module 106 can contain portions of source code to facilitate communication between the generated computer program and one or more of foreign applications 153 in accordance with a standard. In another example, framework module 106 includes portions of source code to communicate with foreign application using transmission control protocol (TCP) and internet protocol (IP), e.g., TCP/IP, Hypertext Transfer Protocol (HTTP) and/or Hypertext Transfer Protocol Secure (HTTPS).

A third step 2037 of process 228 of FIG. 20 is generating the structure for the class. As an example, code generation module 105 (FIG. 1) can perform this step. Generating the basic structure for the class can involve creating a namespace collection of the class, creating the constructor/destructor methods for the class, and creating the initialization method.

After creating the structure for the class, a fourth step 2038 in the process 228 of FIG. 20 is generating methods for each user action using the data and the predefined portions of source code. The information gathered in steps 222 and 227 (FIG. 2) can also be used in generating the methods. Code generation module 105 (FIG. 1) can create for each action of user, one or more methods, which are members of the class. In one embodiment, for each action, code generation module 105 generates the method or methods by using the portion of source code in storage module 112 (FIG. 1) or framework module 106 (FIG. 1) corresponding to the action.

In one embodiment, different routines can be used to generate the source code for lead and follow events. In another embodiment, the same routine can be used to generate the source code for both lead and follow events.

The next step 2039 of process 228 in FIG. 20 is generating any additional source code necessary to repeat the scenario. Depending on the scenario and application 152 (FIG. 1), additional dynamically generated code can be necessary. For example, if the scenario involves communicating with one of foreign applications 153 (FIG. 1) following a standard protocol, initialization, connection, and disconnection routines could be need.

Turning back to FIG. 2, after generating the source code in process 228, an executable program can be generated in process 229. As an example, the source code generated by code generation module 105 (FIG. 1) in process 228 can be compiled into an executable program by system 100 (FIG. 1) using an executable generating module (not shown), using code generation module 105, or by using an independent complier program. In other embodiments, an interpreter can be used to run the source code directly if the source code is in a suitable language.

After the source code is generated, user 150 (FIG. 1) or another person has multiple options to edit or modify the source code. For example, user 150 can click on the "Code . . . " button 385 in window 363 (FIG. 3) to view and edit the source code. In one embodiment, code editor module 108 (FIG. 1) is capable of allowing modification to the source code.

Figure 21:
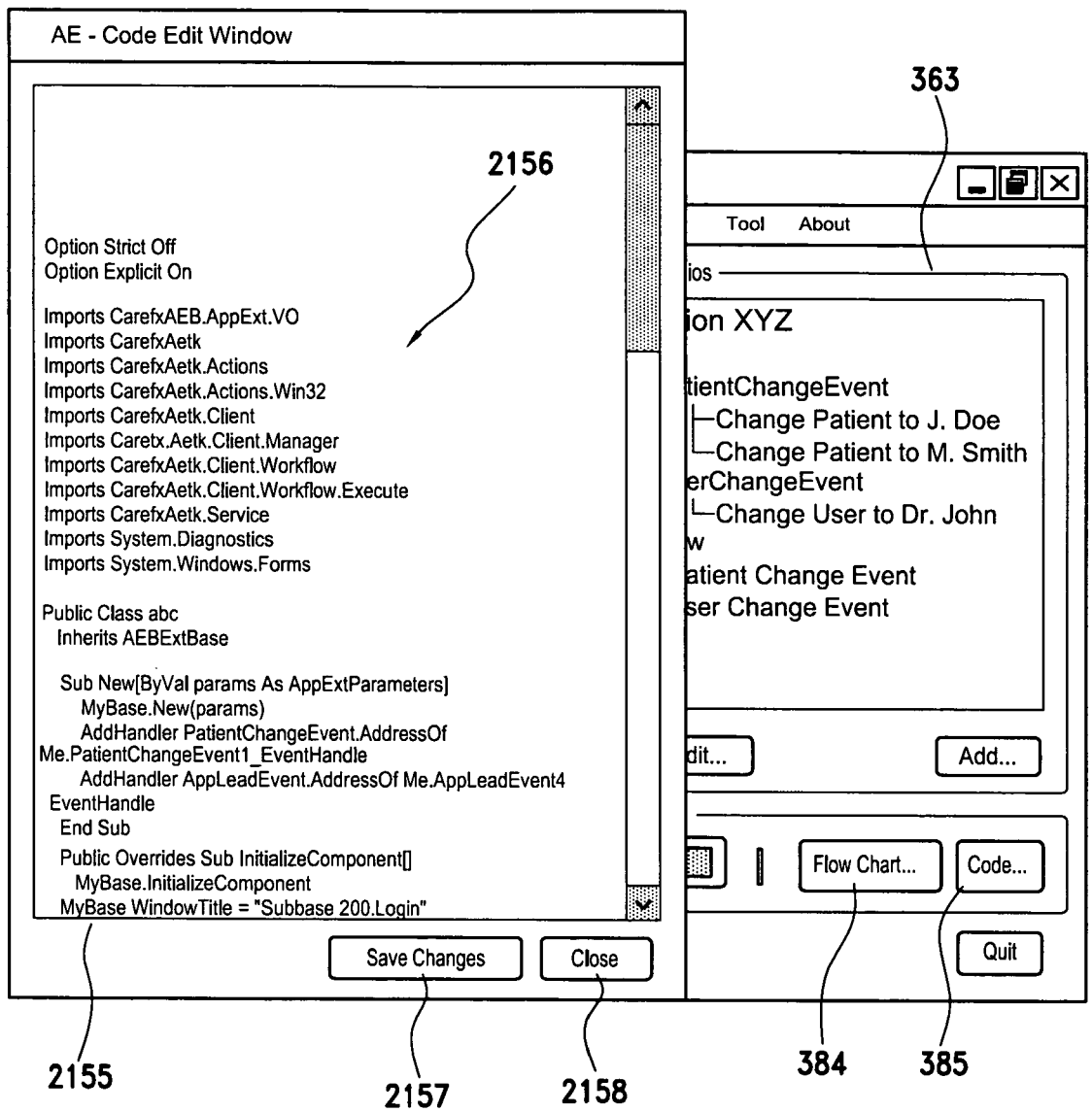
FIG. 21 illustrates the primary control window of FIG. 3 and a code edit window, according to the first embodiment.

As an example, FIG. 21 illustrates window 363 and a code edit window 2155, according to the first embodiment. In window 2155, a person can view and edit source code 2156. Source code 2156 can be the source code generated in process 229 (FIG. 2) by code generation module 105 (FIG. 1) or source code created by code generation module 105 (FIG. 1) after a previous modification. A person can modify the source code by editing it in window 2155 and clicking a "Save Changes" button 2157 to save the changes. If the person does not want to save the changes or did not make any changes, window 2155 can be closed by clicking on a "Close" button 2158.

In one embodiment, if changes are made to the source code, code generation module 105 (FIG. 1) automatically generates a new executable program based on the edited source code, and correlative action module 104 (FIG. 1) automatically modifies the data objects based on the edited source code.

In another example, the source code can be modified by modifying a visual representation of the actions of the user. In this embodiment, user 150 (FIG. 1) or another person can click on the "Flow Chart . . . " button 384 in window 363 (FIG. 3) to view an editable visual representation of actions of the user. In one embodiment, modification module 118 (FIG. 1) in visualization module 107 (FIG. 1) automatically uses changes to the visual representation to modify the data objects or source code.

Figure 22:
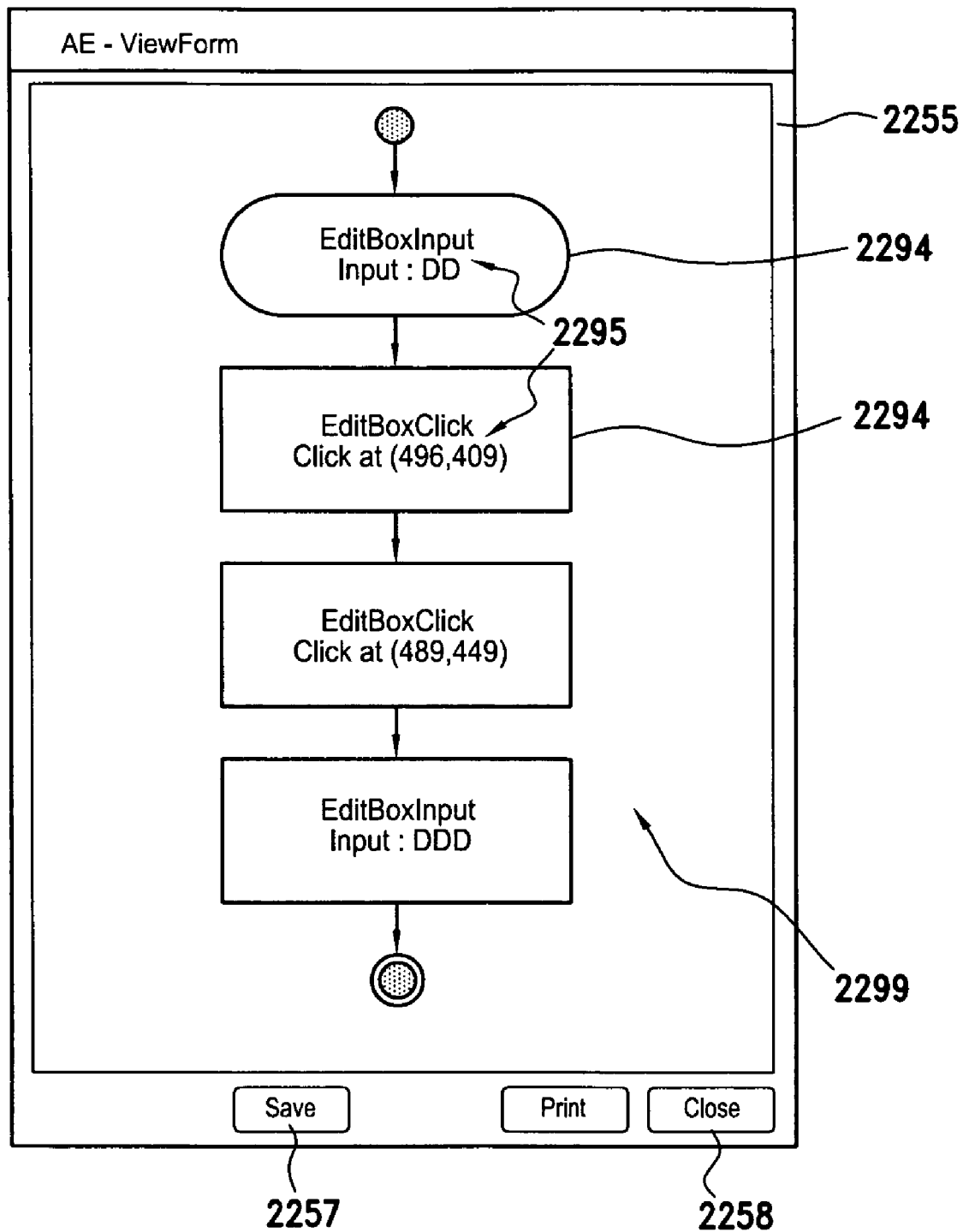
FIG. 22 illustrates a visualization window according to the first embodiment.

As an example, FIG. 22 illustrates a visualization window 2255, according to the first embodiment. Window 2255 illustrates a flow chart 2299. Flow chart 2299 can be generated by a process similar to the process outlined in FIGS. 14 and 15. In some embodiments, flow chart 2299 in window 2255 in FIG. 22 can be modified by modification module 118 (FIG. 1). Modification module 118 is capable of using the edits to flow chart 2299 to modify the data for the recorded actions of user. For example, a person can click on boxes 2294 in flow chart 2299 to modify the action described by text 2295 within boxes 2294. In this example, another window (not shown) can be opened to allow user to type in the modified action or select a new action from a drop down list. The changes can be saved by clicking on a "Save Changes" button 2257. Allowing modification of the actions of user 150 (FIG. 1) through flow chart 2299 permits a person to easily correct an incorrect action by user 150 or eliminate unnecessary or redundant actions.

In one embodiment, when modification module 118 (FIG. 1) edits flow chart 2299 in FIG. 22, modification module 118 notifies correlative action module 104 (FIG. 1) and code generation module 105 (FIG. 1). Correlative action module 104 can automatically regenerate the data objects based on the modified data, and/or code generation module 105 can automatically regenerate the source code. In other embodiment, modification module 118 uses changes to the visual representation to modify the data.

In some embodiments, user 150 (FIG. 1) can edit flow chart 2299 and even rearrange the order of steps (i.e., boxes) via drag and drop. Then the system can automatically re-generate the code according to the new flow chart.

Figure 23:
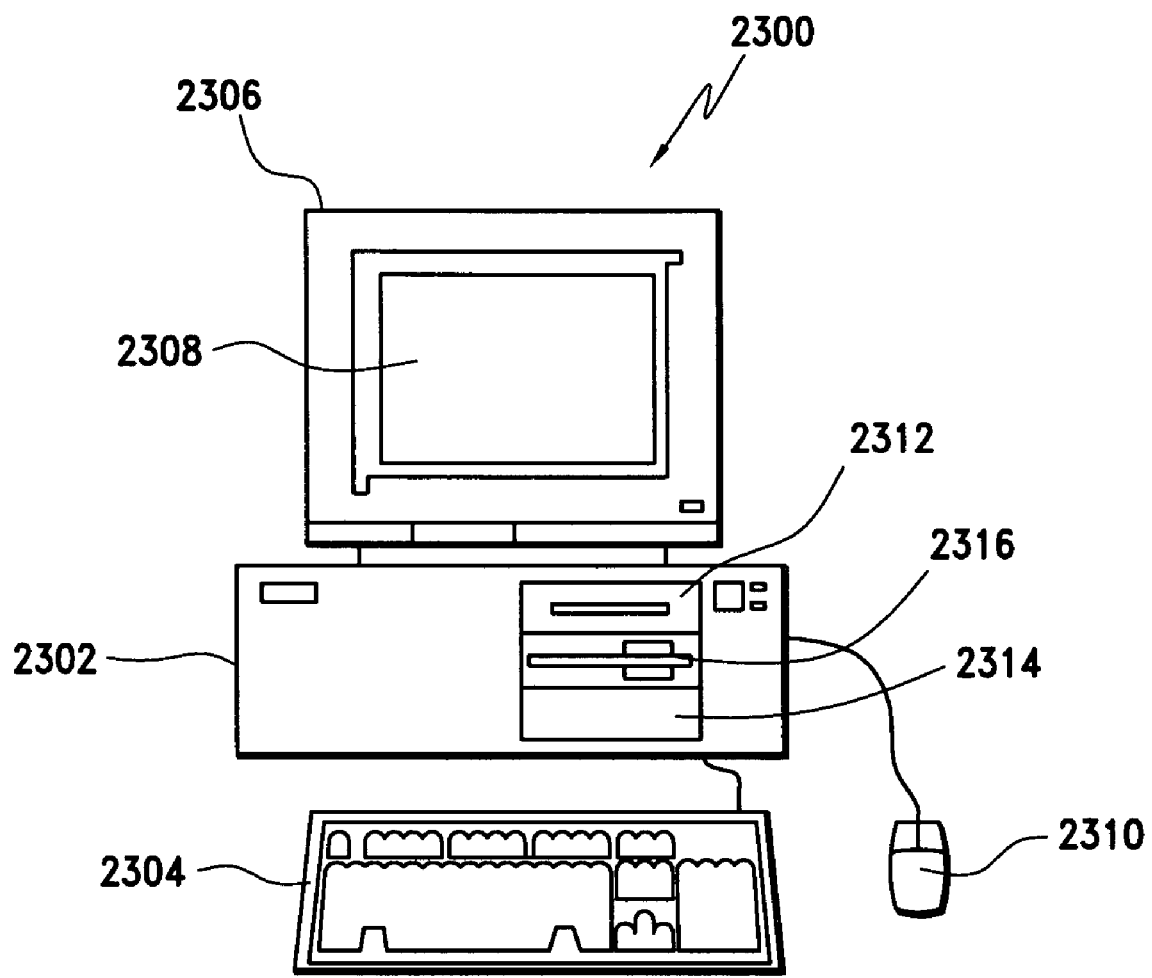
FIG. 23 illustrates a computer that is suitable for implementing an embodiment of the system of FIG. 1.
Figure 24:
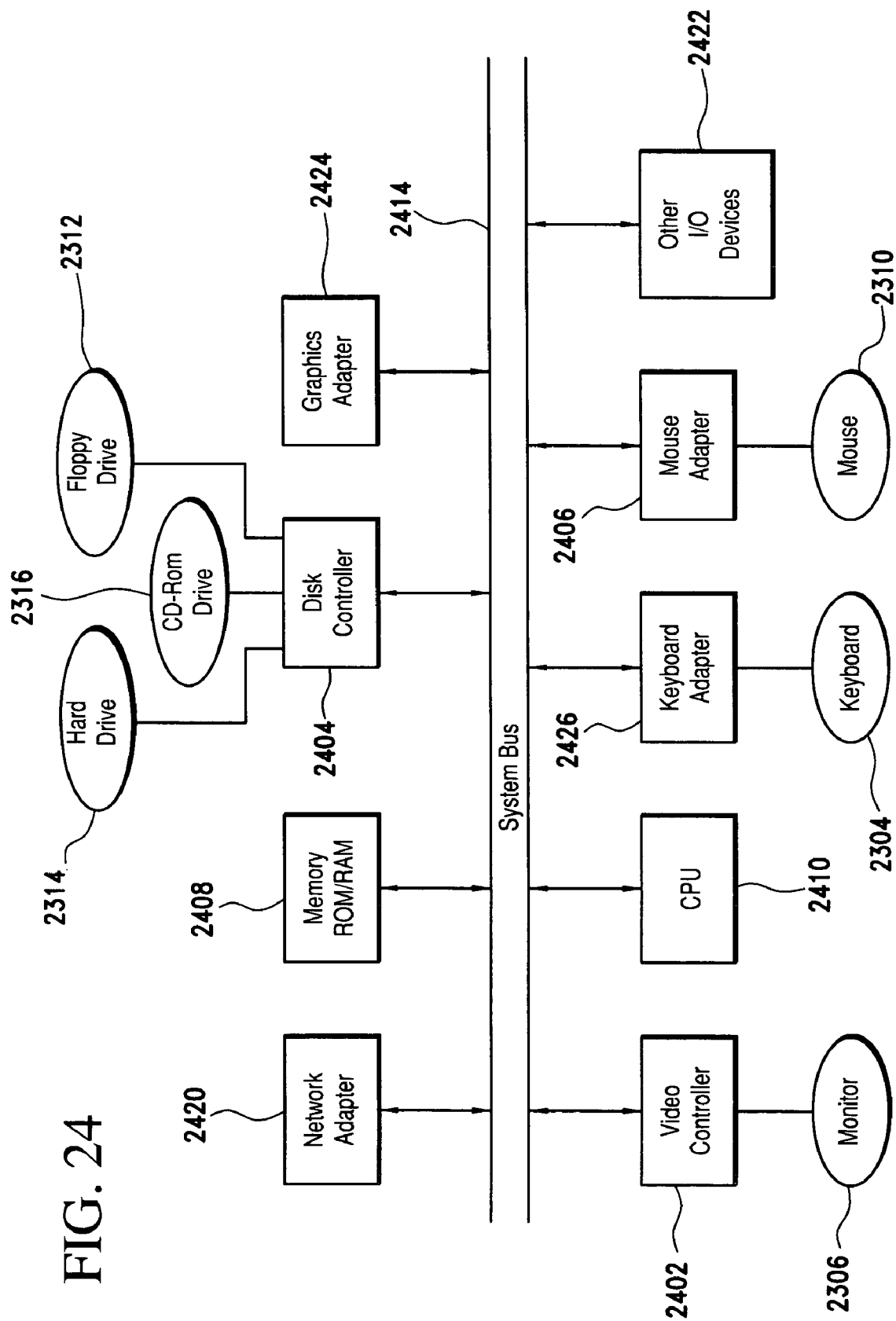
FIG. 24 illustrates a representative block diagram of the elements included on the circuit boards inside the chassis of the computer of FIG. 23.

FIG. 23 illustrates a computer 2300 that is suitable for implementing an embodiment of system 100 (FIG. 1). Computer 2300 includes a chassis 2302 containing one or more circuit boards (not shown), a floppy drive 2312, a Compact Disc Read-Only Memory (CD-ROM) drive 2316, and a hard drive 2314. A representative block diagram of the elements included on the circuit boards inside chassis 2302 is shown in FIG. 24. A central processing unit (CPU) 2410 in FIG. 24 is coupled to a system bus 2414 in FIG. 24. In various embodiments, the architecture of CPU 2410 can be compliant with any of a variety of commercially distributed architecture families including the RS/6000 family, the Motorola 68000 family, or the Intel x86 family.

System bus 2414 also is coupled to memory 2408 that includes both read only memory (ROM) and random access memory (RAM). Non-volatile portions of memory 2408 (ROM) can be encoded with a boot code sequence suitable for restoring computer 2300 (FIG. 23) to a functional state after a system reset. In addition, memory 2408 can include microcode such as a Basic Input-Output System (BIOS).

In the depicted embodiment of FIG. 24, various I/O devices such as a disk controller 2404, a graphics adapter 2424, a video controller 2402, a keyboard adapter 2426, a mouse adapter 2406, a network adapter 2420, and other I/O devices 2422 can be coupled to system bus 2414. Keyboard adapter 2426 and mouse adapter 2406 are coupled to a keyboard 2304 (FIGS. 23 and 24) and a mouse 2310 (FIGS. 23 and 24), respectively of computer 2300 (FIG. 23). While graphics adapter 2424 and video controller 2402 are indicated as distinct units in FIG. 24, it will be appreciated that video controller 2402 can be integrated into graphics adapter 2424, or vice versa. Video controller 2402 is suitable for refreshing a monitor 2306 (FIGS. 23 and 24) to display images on a screen 2308 (FIG. 22) of computer 2300 (FIG. 23). Disk controller 2404 can control hard drive 2314 (FIGS. 23 and 24), floppy drive 2312 (FIGS. 23 and 24), and CD-ROM drive 2316 (FIGS. 23 and 24). In other embodiment, distinct units can be used to control each of these devices separately.

Although many other components of computer 2300 (FIG. 23) are not shown, such components and their interconnection are well known to those of ordinary skill in the art. Accordingly, further details concerning the construction and composition of computer 2300 and the circuit boards inside chassis 2302 (FIG. 23) need not be discussed herein.

When the computer 2300 in FIG. 23 is running, program instructions stored on a floppy disk in floppy drive 2314, on a CD-ROM in CD-ROM drive 2316, on hard drive 2314, or in memory 2408 (FIG. 24) are executed by CPU 2410 (FIG. 24). A portion of the program instructions, stored on these devices, can be suitable for carrying out the method of generating a computer program with system 100 (FIG. 1) as described previously with respect to FIGS. 1-22.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that processes 220-229 of FIG. 2 or any element of FIG. 1 may be comprised of many different steps and be performed by many different modules, and that the foregoing discussion of certain of these embodiments does not necessarily represent a complete description of all possible embodiments. For example, in some embodiments, process 226 of FIG. 2 can occur after process 228. In this example, the data generated by process 224 can be used to generate the visual representations used in process 227 of FIG. 2.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims. Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A computer program generation system including a processor, the computer program generation system for creating a computer program for use with one or more applications, the computer program generation system comprising:
   a recorder module capable of recording data captured from actions of a user of the one or more applications for a scenario;
   a storage module to store predefined portions of source code;
   a correlative action module capable of generating data objects by translating the data from the recorder module into the data objects;
   a visualization module capable of generating additional information about the scenario, wherein the additional information about the scenario includes modified data objects for the actions of the user of the one or more applications for the scenario;
   a code generation module capable of generating source code for the computer program using the data objects from the correlative action module, the modified data objects from the visualization module, and the predefined portions of source code from the storage module; and
   an executable generating module capable of generating an executable program based on the source code for the computer program,
   wherein:
   the computer program comprises the executable program;
   the recorder module is configured to record the data for the scenario with a first set of data, the data comprises the first set of data;
   execution of the executable program permits repetition of the actions of the user of the one or more applications for the scenario with a second set of data;
   the first set of data is different than the second set of data;
   the executable program is separate from the computer program generation system;
   the code generation module is configured to generate the source code by analyzing the data objects and the modified data objects to determine whether at least one of the predefined portions of source code relate to the actions of the user;
   the code generation module is also configured to generate the source code by generating an organization for the source code using the data objects, the modified data objects, and the at least one of the predefined portions of source code; and
   the code generation module is also configured to generate the source code by dynamically generating any additional source code used in repeating the scenario for the second set of data.

2. The system of claim 1, wherein:
the data objects are extensible markup language files.

3. The system of claim 1, further comprising:
a user interface module capable of rendering a graphical user interface to control the recording of the recorder module and modification of the data for the actions of the user.

4. The system of claim 1, wherein:
the visualization module is capable of automatically generating a visual representation of the data for the actions of the user.

5. The system of claim 4, wherein:
the visualization module comprises:
   a graphics module capable of automatically generating a flow chart of the data for the actions of the user; and
the flow chart is the visual representation of the data.

6. The system of claim 4, wherein:
the visualization module further comprises:
   a modification module capable of modifying the data for the actions of the user by allowing editing of the visual representation of the data for the actions of the user.

7. The system of claim 6, wherein
the code generation module is capable of automatically generating the source code for the computer program based on the data modified by the modification module.

8. The system of claim 1, further comprising:
a code editor module capable of allowing modification to the source code for the computer program.

9. The system of claim 8, wherein:
the executable generating module is further capable of automatically generating the executable program based on the source code for the computer program as modified by the code editor module.

10. The system of claim 1, further comprising:
a user interface module capable of rendering a graphical user interface to begin and end the recording of the recorder module and modification of the source code for the computer program.

11. The system of claim 1, wherein:
the storage module comprises:
   a framework module capable of facilitating communication between the computer program and one or more foreign applications; and
the framework module provides predefined source code to the code generation module, which allows the computer program to communicate with the one or more foreign applications.

12. The system of claim 1, wherein:
the recorder module comprises:
   a monitor module capable of monitoring for actions by the user; and
   a recorder utility capable of recording the data captured from the actions of the user.

13. The system of claim 12, wherein:
the monitor module comprises:
system hooks capable of monitoring for a sequence of events.

14. The system of claim 1, wherein:
the recorder module records only a portion the actions of the user.

15. The system of claim 1, wherein:
the recorder module is capable of recording the data caused by actions of the user of one or more health care applications; and
the one or more applications comprise the one or more health care applications.

16. A computer program generation system includes a processor for generating an executable script to perform a scenario, the computer program generation system comprising:
a recorder module to record data comprising:
(a) first data caused by first user actions for one or more applications in the scenario;
(b) operating system information related to the first user actions and the scenario; and
(c) information about the one or more applications that is related to the first user actions and the scenario;
a correlative action module to create data objects by translating the recorded data into the data objects;
a storage module to store predefined portions of source code;
a visualization module to generate additional information about the scenario, wherein the additional information about the scenario includes modified data objects for the scenario; and
a code generation module to generate the executable script from data objects and the predefined portions of source code from the storage module by analyzing the data objects and modified data objects to determine whether at least one of the predefined portions of source code relate to the actions of the user, wherein:
the executable script is separate from the computer program generation system; and
execution of execute the executable script permits repetition of the scenario for second user actions, wherein the first user actions are different than the second user actions.

17. The system of claim 16, wherein:
the visualization module is configured to generate a visual representation of the first data caused by the first user actions recorded by the recorder module.

18. The system of claim 17, wherein:
the recorder module further comprises:
a monitor module; and
a recorder utility to record the first data caused by the first user actions; and
the monitor module uses system hooks to monitor for events.

19. The system of claim 18, wherein:
the visualization module comprises:
a graphics module to generate a flow chart of the first data caused by the first user actions recorded by the recorder module, and
the flow chart comprises the visual representation.

20. The system of claim 19, wherein:
the visualization module further comprises:
a modification module to allow a person to perform modifications to the flow chart generated by the visualization module, which automatically modifies the executable script, the data objects, and the first data caused by the first user actions.

21. The system of claim 20, further comprising:
a code editor module to allow the person to perform modifications to the executable script, which automatically modifies the flow chart, the data objects, and the first data caused by the first user actions.

22. The system of claim 21, wherein:
the code generation module further comprises:
an executable generator to generate an executable program from the executable script.

23. The system of claim 16, wherein:
the executable script is used to perform the scenario for an application in health care.

24. A computer program generation system includes a processor for generating a computer program, the computer program generation system comprising:
a recorder module to record data captured from user actions of one or more applications for a scenario;
a data object generation module to create data objects based on the recorded data of the user actions of the one or more applications for the scenario, related information about an operating system carrying out the user actions, and the one or more applications;
a graphics module to generate a visual representation of the user actions, where the graphics module allows modification of the visual representation, which automatically modifies the data objects;
a storage module to provide predefined portions of source code related to the user actions; and
a code generation module to generate source code for the computer program at least in part from the data objects, as modified by the graphics module, and at least one portions of the predefined portions of source code related to the user actions, wherein:
the code generation module is configured to generate the source code by analyzing the data objects, as modified by the graphics module, to determine whether one or more portions of the predefined portions of source code related to the user actions, the related information about the operating system, or the one or more applications;
the code generation module is also configured to generate the source code by generating an organization for the source code using the data objects, as modified by the graphics module, and the one or more portions of the predefined portions of source code; and
the code generation module is also configured to generate the source code by dynamically generating any additional source code used in repeating the scenario.

25. The system of claim 24, wherein:
the graphics module comprises:
a first graphics module to automatically generate a flow chart of the user actions; and
a modification module to allow modification of the flow chart; and
the flow chart is the visual representation.

26. The system of claim 25, wherein:
the modification module configured to allow modification of the flow chart by using input from a keyboard and a mouse coupled to a computer that executes the computer program generation system.

27. The system of claim 24, wherein:
the code generation module is configured not to use the visual representation of the user actions in generating the source code for the computer program.

28. The system of claim 24, wherein:
the computer program is used for a health care application.

29. A method to generate a computer program, the method comprising:
  recording data caused by actions of a user of one or more running applications for a scenario;
  automatically providing data objects by translating the recorded data caused by the actions of the user of the one or more running applications for the scenario;
  providing predefined portions of source code related to the actions of the user;
  generating additional information about the scenario based on input by the user, wherein the additional information about the scenario includes modified data objects for the actions of the user of the one or more applications for the scenario;
  generating source code from the data objects, the modified data objects, and the predefined portions of source code, wherein generating the source code comprises:
    retrieving the data objects from a computer memory;
    analyzing the data objects and the modified data objects to determine whether at least one part of the predefined portions of source code relate to the actions of the user of the one or more running application for the scenario; and
    generating an organization for the source code using the data objects the data objects, the modified data objects, and the at least one part of the predefined portions of source code;
  creating the source code of the computer program using the organization;
  dynamically generating any additional source code used in repeating the scenario; and
  generating an executable program based on the source code and the additional source code of the computer program.

30. The method of claim 29, further comprising:
editing the data caused by actions of the user.

31. The method of claim 29, wherein:
generating the source code comprises:
  automatically generating the source code after recording the data caused by the actions of the user.

32. The method of claim 29, further comprising:
using a graphical user interface to start and stop the recording of the data caused by the actions of the user of the one or more running applications.

33. The method of claim 29, further comprising:
recording information about a running operating system related to the actions of the user;
recording information about the one or more running applications that is related to the actions of the user; and
automatically compiling the source code and the additional source code into the computer program before generating the executable program.

34. The method of claim 29, further comprising:
automatically generating a visual representation of the actions of the user.

35. The method of claim 34, further comprising:
editing the visual representation of the actions of the user to modify the data caused by the actions of the user.

36. The method of claim 35, further comprising:
modifying the source code.

37. The method of claim 29, wherein:
recording the data caused by the actions of the user comprises:
  recording only a portion of the data caused by the actions of the user of the one or more running applications.

38. The method of claim 29, further comprising:
displaying a recording icon while recording the data caused by the actions of the user.

39. The method of claim 29, further comprising:
after dynamically generating the additional source code, automatically compiling the source code and the additional source code into the computer program configured to be used in a healthcare field.

40. A method for creating a computer program, the computer program permits repetition of actions of a user of one or more applications for a scenario, the method comprising:
  using a graphical user interface to start and stop the recording of first user actions of the user of the one or more applications in the scenario, operating system information related to the first user actions and the scenario, and information about the one or more applications that is related to the first user actions and the scenario;
  automatically providing data objects based on the first users actions of the user of the one or more applications in the scenario, the operating system information related to the first user actions and the scenario, and the information about the one or more applications that is related to the first user actions and the scenario;
  automatically generating a visual representation of the first user actions of the user of the one or more applications in the scenario;
  editing the visual representation of the actions of the user to modify the first user actions of the user of the one or more applications for a scenario
  providing predefined portions of source code related to the first user actions of the user of the one or more applications for a scenario, the operating system information related to the first user actions and the scenario; and the information about the one or more applications that is related to the first user actions and the scenario;
  generating other source code from the data objects and the predefined portions of source code; and
  generate an executable program from the other source code,
  wherein:
    execution of the executable program permits repetition of the scenario for second user actions; and
    the first user actions are different than the second user actions.

41. The method of claim 40, wherein:
generating the executable program further comprising:
  automatically compiling the other source code into the computer program.

* * * * *